United States Patent
Kandori et al.

(10) Patent No.: US 7,126,733 B2
(45) Date of Patent: Oct. 24, 2006

(54) OPTICAL DEFLECTOR

(75) Inventors: Atsushi Kandori, Kanagawa (JP); Masao Majima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/359,441

(22) Filed: Feb. 23, 2006

(65) Prior Publication Data
US 2006/0176535 A1    Aug. 10, 2006

Related U.S. Application Data

(62) Division of application No. 10/787,770, filed on Feb. 27, 2004, now Pat. No. 7,079,298.

(30) Foreign Application Priority Data
Mar. 3, 2003    (JP) ............................. 2003-055785

(51) Int. Cl.
*G02B 26/08*    (2006.01)
(52) U.S. Cl. ..................... 359/196; 359/214; 359/900; 250/234
(58) Field of Classification Search ............... None
See application file for complete search history.

(56) References Cited

U.S. PATENT DOCUMENTS

| 5,552,919 A | 9/1996 | Majima et al. |
| 5,594,577 A | 1/1997 | Majima et al. |
| 5,606,447 A | 2/1997 | Asada et al. |
| 5,654,814 A | 8/1997 | Ouchi et al. |
| 5,774,243 A | 6/1998 | Majima |
| 5,886,802 A | 3/1999 | Majima |
| 6,101,014 A | 8/2000 | Majima |
| 6,104,516 A | 8/2000 | Majima |
| 6,188,499 B1 | 2/2001 | Majima |
| 6,819,407 B1 | 11/2004 | Arita et al. |
| 7,079,297 B1 * | 7/2006 | Sakai ......................... 359/196 |

FOREIGN PATENT DOCUMENTS

JP    2001-305471    10/2001

* cited by examiner

*Primary Examiner*—James Phan
(74) *Attorney, Agent, or Firm*—Fitzpatrick, Cella, Harper & Scinto

(57) ABSTRACT

An optical deflector comprises a control means for controlling at least either a light source or a deflection means adapted to gauge the distance between the position of a deflected beam of light moving on a light receiving element in one direction and the position of another deflected beam of light moving on the light receiving element in the opposite direction and control the distance so as to make it agree with a predetermined value. Thus, the optical deflector can very accurately control the operation of the deflection means in such a way that it is not affected by changes of environmental temperature of the deflection means and the detection circuit, because a detection means for detecting the time when a beam of light passes by a predetermined angle of deflection of the deflection means is not used.

4 Claims, 18 Drawing Sheets

OPTICAL DEFLECTOR

This is a division of application Ser. No. 10/787,770, filed Feb. 27, 2004 now U.S. Pat. No. 7,079,298.

BACKGROUND OF THE INVENTION

1. Field of the Invention

This invention relates to an optical deflector having a deflection means for deflecting light.

2. Related Background Art

FIG. 1 of the accompanying drawings illustrates a galvano-mirror as an example of optical deflector that is driven by electromagnetic force. A mirror is arranged on a movable section, which is supported by a main body by way of a pair of torsion bars so that it may be rotated relative to a central axis. In FIG. 1, reference symbol 50 denotes a silicon substrate and reference symbols 51 and 52 respectively denote an upper glass substrate and a lower glass substrate. There are also shown a movable plate 53, a pair of torsion bars 54, a planar coil 55, a total reflection mirror 56, a pair of electrode terminals 57 and permanent magnets 60 through 63. The illustrated optical deflector is of the electromagnetic type that is driven by causing a drive current to flow through the planar coil 55 and utilizing the Lorentz force that is generated by the drive current and the permanent magnets (see, inter alia, U.S. Pat. No. 5,606,447).

Japanese Patent Application Laid-Open No. 2001-305471 describes an electromagnetic actuator. This patent document has much in common with U.S. Pat. No. 5,606,447 in that a movable part is driven by electromagnetic force. The electromagnetic actuator disclosed in Japanese Patent Application Laid-Open No. 2001-305471 also has a total reflection mirror arranged on a movable part.

Japanese Patent Application Laid-Open No. 2001-305471 describes a system as follows in terms of problems, objects and means. The invention disclosed in the above patent document paid attention to the fact that the resonance period of an electromagnetic actuator normally drifts with temperature and time and hence, if an electric current having a predetermined, constant resonance frequency is continuously supplied to the planar coil, there arises a problem that it is not possible to control the angle of deflection and keep it to a constant value with temperature change and time lapse. Thus, the first object of that invention is to provide an electromagnetic actuator that can be driven to reciprocate with its resonance period without providing a separate detection means as well as a drive control device and a drive control method to be used for such an electromagnetic actuator. The second object of that invention is to provide an electromagnetic actuator whose angle of deflection can be controlled without providing a separate detection means as well as a drive control device and a drive control method to be used for such an electromagnetic actuator. The third object of the invention is to provide a resonance frequency signal generating device and a resonance frequency signal generating method to be used for an electromagnetic actuator that can output a resonance frequency signal corresponding to the resonance period of the electromagnetic actuator.

The invention of the above cited patent document utilizes a coil as means for exciting the movable section of the electromagnetic actuator and also as detection means. The induced voltage or current in the coil is utilized for detection.

While Japanese Patent Application Laid-Open No. 2001-305471 describes that the resonance period of an electromagnetic actuator drifts with temperature and time, it proposes to detect the time when the actuator passes by a predetermined angle of revolution (deflection) from the coil that is a detection means as time-related information.

U.S. Pat. No. 5,606,447 does not pay attention to the problem that the resonance period of an electromagnetic actuator drifts with temperature.

With the method of detecting the time when the actuator passes by a predetermined angle of deflection gives rise to a signal delay in the detection circuit due to changes of environmental temperature. Additionally, timing errors can occur when gauging the change with time of the angle of deflection and detecting the time on the basis of the gauged change because the detection timing can be shifted by signal noises and offsets.

Thus, the problem of signal delays and timing errors arises when accurately controlling an actuator by such a method of detecting the time when the actuator passes by a predetermined angle of deflection.

SUMMARY OF THE INVENTION

The inventor of the present invention came up with an idea different from that of the inventor of the invention disclosed in Japanese Patent Application Laid-Open No. 2001-305471. More specifically, it is the object of the present invention to make it possible to very accurately control the operation of a deflection means, or an actuator, without using a detection means for detecting the time when a beam of light passes by a predetermined angle of deflection, or actuator, in such a way that it is not affected by changes of environmental temperature of the deflection means and the detection circuit.

Thus, according to the invention, there is provided an optical deflector having a deflection means for deflecting modulated light from a light source so as to make deflected beams of light scan, said optical deflector comprising a control means for gauging a distance between a position of a deflected beam of light moving on a light receiving element in one direction and a position of another deflected beam of light moving on the light receiving element in the opposite direction and controlling at least either the light source or the deflection means so as to make the distance agree with a predetermined value.

In another aspect of the invention, there is provided a method of controlling an optical deflector adapted to deflect light from a light source so as to make deflected beams of light scan, the method comprising: a position detecting step of detecting a position of a deflected beam of light moving on a light receiving element in one direction and a position of another deflected beam of light moving on the light receiving element in the opposite direction; a step of sensing a phase difference between a phase as detected in the detecting step and a predefined phase; and a step of controlling either a drive frequency being applied to the optical deflector or a modulation timing for reciprocative drawing according to an outcome of the sensing step.

DESCRIPTION OF THE PREFERRED EMBODIMENTS (First Embodiment)

The inventor of the present invention came to have an idea of utilizing deflected beams of light that are emitted from a light source and deflected to reciprocate for scanning by a deflection means that also reciprocates (swings), for controlling at least either the light source or the deflection means.

More specifically, according to the invention, deflected beams of light moving forward and moving backward are detected by a light receiving element and either the deflection means or the light source is controlled by way of a control means in such a way that the distance (displacement) between the position of the forwardly moving deflected beam of light and that of the backwardly moving deflected beam of light, each at a given clock time, shows a predetermined value.

Figure 1:
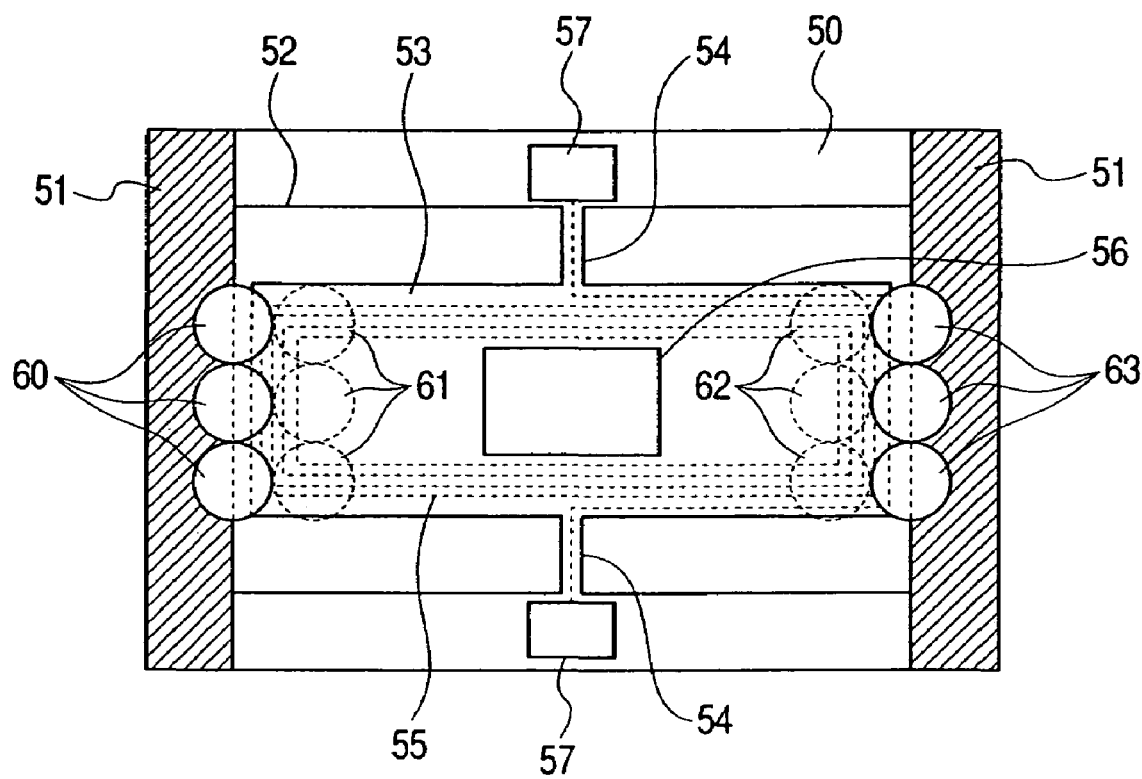
FIG. 1 is a schematic illustration of an optical deflector.
Figure 2:
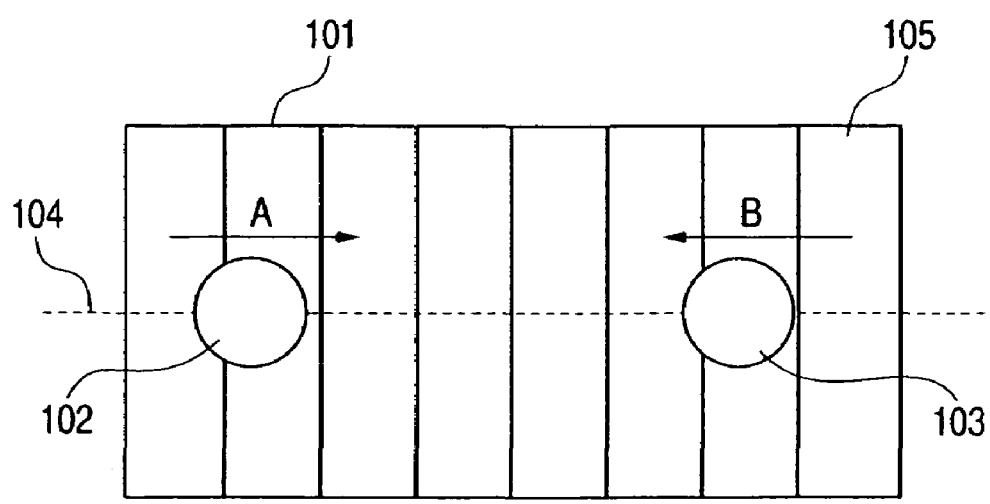
FIG. 2 is a schematic illustration of scanning of beams of light that are deflected (reflected) by the deflection means of the first embodiment of optical deflector so as to reciprocate on a light receiving element, showing the deflected beams of light scanning only in one direction along with the trajectory thereof.

FIG. 2 is a schematic illustration of scanning of beams of light that are deflected (reflected) by the deflection means of the first embodiment of optical deflector so as to reciprocate on a light receiving element, showing the deflected beams of light along with the trajectory thereof.

In FIG. 2, reference symbol 101 denotes the light receiving element and reference symbols 102 and 103 denote the deflected beams of light, while reference symbol 104 denotes the trajectory of the deflected beams of light.

The deflected beam of light 102 moves along the trajectory 104 in direction A. The other deflected beam of light 103 moves along the trajectory 104 in direction B. Both the deflected beam of light 102 and the deflected beam of light 103 pass by the light receiving element 101.

The light receiving element 101 is arranged at a predetermined position where it can detect (receive) both the deflected beam of light moving forward and the deflected beam of light moving backward. Provided that the deflected beam of light 102 moving forward and the deflected beam of light 103 moving backward passing by the receiving element 101 take respective positions that are different from each other at a given clock time for each, the distance between the positions of the deflected beams of light 102, 103 is the distance of displacement.

With this embodiment, at least either the deflection means or the light source is controlled by a control means, which will be described in greater detail hereinafter, in such a way that the displacement is found within an appropriate range of displacement (predetermined distance).

The embodiment will be described in greater detail below.

Firstly, the positional displacement between the position of the beam of light moving forward and that of the beam of light moving backward that are deflected by a deflection means will be discussed.

Figure 3:
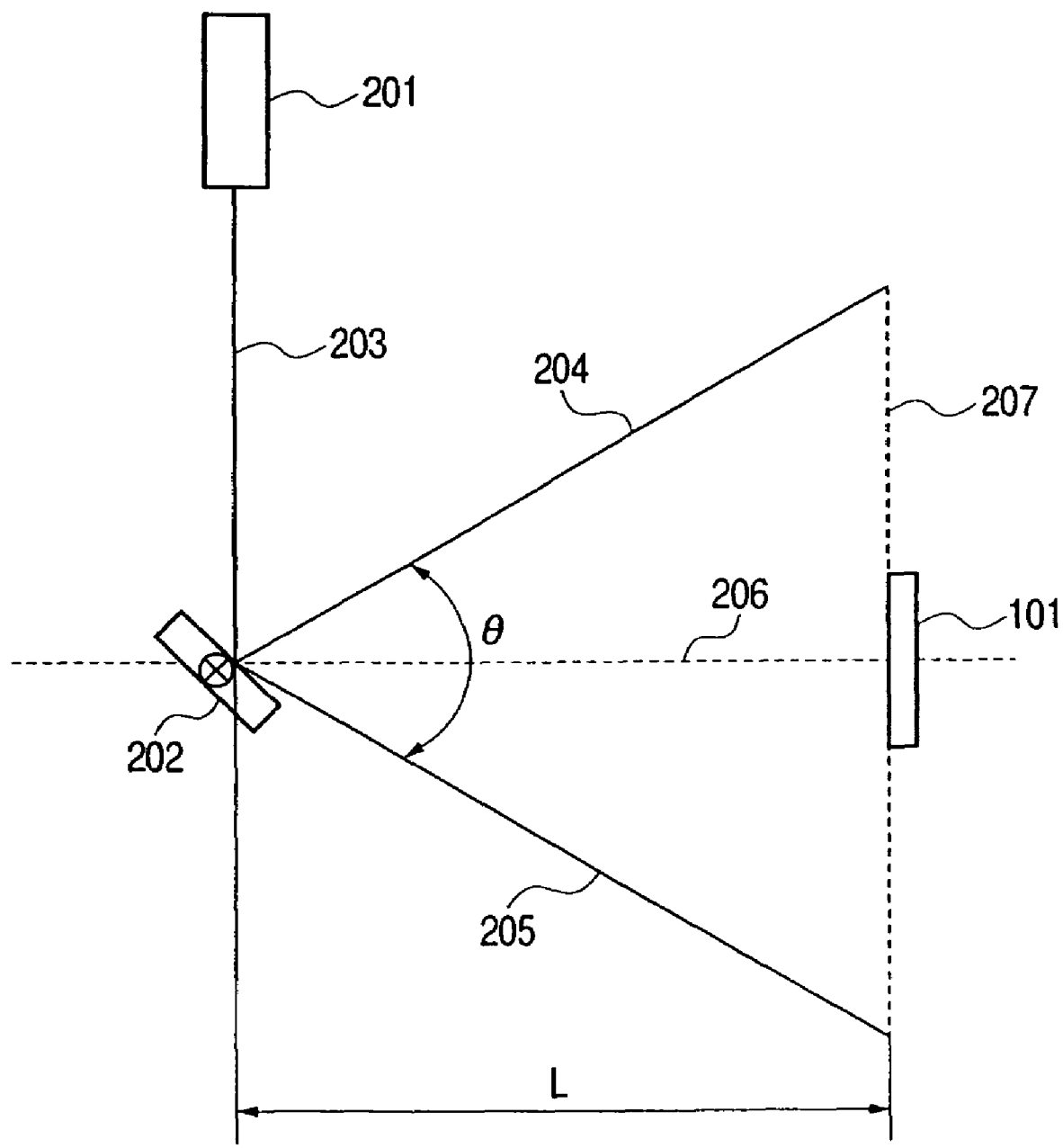
FIG. 3 is a schematic cross sectional view of the first embodiment of optical deflector taken along a plane containing a beam of light deflected by the deflection means.

FIG. 3 is a schematic cross sectional view of the first embodiment of optical deflector taken along a plane containing beams of light deflected by the deflection means.

In FIG. 3, there are shown a light source 201, a deflection means 202, a beam of light 203 emitted from a light source, beams of light 204, 205 that are deflected by the deflection means 202 with the largest angle of deflection, the central axis 206 of optical deflection of the deflection means 202 and the scanning trajectory 207 on plane P that is separated from the deflection means 202 by distance L (plane perpendicular to the central axis 206 of optical deflection).

The beam of light 203 emitted from the light source 201 is made to strike the deflection means 202. A light source that is adapted to modulation such as semiconductor laser is used for the light source 201.

The deflection means 202 is provided with a reflection plane so that it deflects a beam of light within the largest angle of deflection as indicated by the beams of light 204, 205 as it is driven to move. The largest angle of deflection is denoted by θ.

In the following description, it is assumed that the reflected beam of light is found on the central axis 206 of optical deflection when the deflection means 202 is not driven to move.

The deflection means 202 is driven to rotate around the rotary axis and reciprocate. A periodical drive waveform is applied to the deflection means.

Figure 4A:
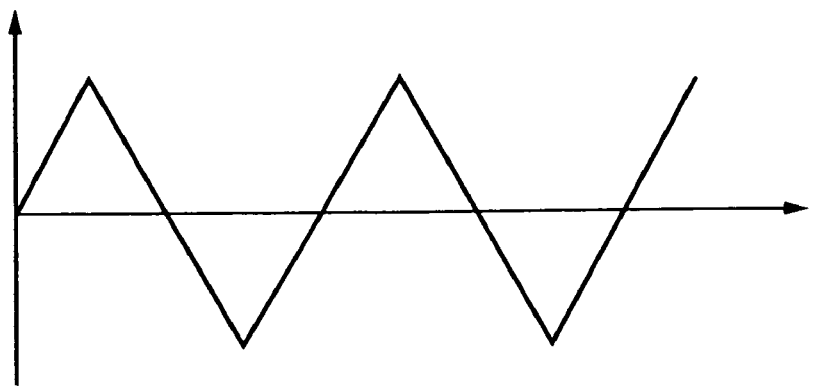
FIGS. 4A, 4B and 4C are graphs illustrating exemplary drive waveforms that can be applied to the deflection means 202 of the first embodiment of optical deflector.
Figure 4B:
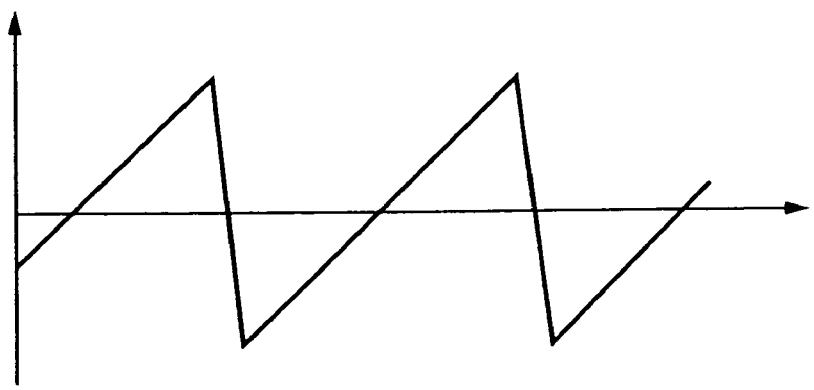
Figure 4C:
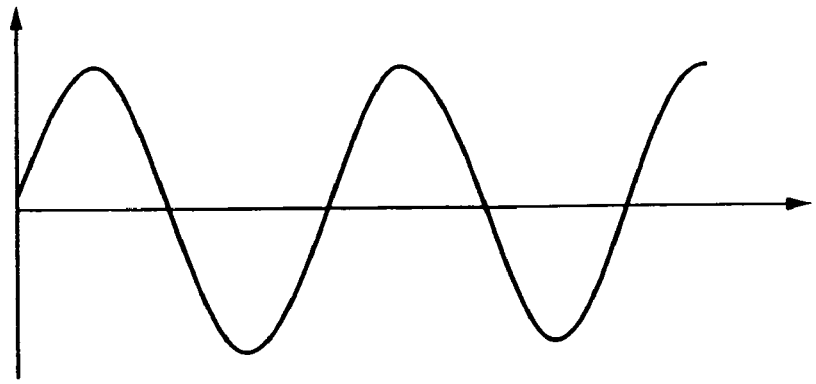

FIGS. 4A through 4C are graphs illustrating exemplary drive waveforms that can be applied to the deflection means 202 of the first embodiment. The horizontal axis represents the duration of application and the vertical axis represents the amplitude of the applied signal. FIG. 4A shows a triangular waveform and FIG. 4B shows a saw-edged waveform, while FIG. 4C shows a sinusoidal waveform. The deflection means 202 changes the angle of deflection corresponding to the waveform of the applied signal.

As the deflection means 202 is driven to deflect a beam of light by applying a periodical signal as shown in any of FIGS. 4A through 4C, the scanning position on the plane P that is separated from the deflection means 202 by distance L (the movement of a deflected beam of light on a plane is referred to as scanning hereinafter) reciprocates on the scanning trajectory 207. The scanning position h (the distance from the central axis 206 of optical deflection on the plane P that is separated from the deflection means 202 by distance L) can be expressed by the equation below;

$$h = L \times \tan(\theta(t)) \qquad (1),$$

where θ(t) represents the angle of deflection by which the beam of light is deflected from the central axis 206 of optical deflection at a given clock time.

It may be assumed here that the light source 201 is operated for modulation and the position of the forwardly moving deflected beam of light 102 and that of the backwardly moving deflected beam of light 103 at a given clock time for each are not displaced from each other.

However, the scanning characteristic of the deflection means 202 can change because of the components change due to temperature changes and the drive means delays. Therefore, if the same waveform is applied to the deflection means at the same timing and the light source 201 is operated for modulation at the same clock time, the timing of deflection (scanning) of the forwardly moving and backwardly moving beams of light may be displaced and hence the position of the forwardly moving deflected beam of light 102 and that of the backwardly moving deflected beam of light 103 at the given clock time for each may be displaced from each other on the light receiving element 101.

With this embodiment, it is hence possible to sense a change in the displacement of the scanning positions of the forwardly moving and backwardly moving beams of light due to changes of various factors relating to the embodiment including environmental factors (changes in the scanning timings) by detecting a relative displacement between the position of the forwardly moving deflected beam of light and that of the backwardly moving deflected beam of light at a given clock time for each.

Note that, while the positions of the deflected beams of light 102, 103 change when the largest angle of deflection θ changes due to various environmental factors, no relative positional displacement of the two deflected beams of light occurs so long as the scanning timing does not change. Therefore, it is possible to detect the relative displacement of the scanning positions of the forwardly moving and backwardly moving deflected beams of light without being influenced by the change in the largest angle of deflection θ.

Now, the method of detecting the relative displacement of the scanning positions of the forwardly moving and backwardly moving deflected beams of light by means of a light receiving element will be described below.

First, a technique of generating modulated spots to be used for detecting the position of a deflected beam of light by means of a light receiving element will be discussed.

The light receiving element 101 is arranged on the scanning trajectory 207 located on the plane P that is separated from the deflection means 202 by distance L. Any position may be selected for the light receiving element 101 so long as it is found on the scanning trajectory 207. For the purpose of simplicity of description, assume here that the light receiving element 101 is arranged substantially at the center of the scanning area.

In order to detect the relative displacement of the scanning positions of the forwardly moving and backwardly moving deflected beams of light at a given clock time for each, a technique of deflecting a modulated beam of light that is obtained by turning on and off the light source to form regions where luminance of light (quantity of light) shows distribution (to be referred to as modulated spot hereinafter) by means of the light receiving element 101 and gauging the positional gap between the modulated spots will be employed. More specifically, as shown in FIG. 2, the light source is turned on and off once at a given clock time within a period of time when a beam of light is caused to forwardly scan on the light receiving element 101 and also once within a period of time when a beam of light is caused to backwardly scan on the light receiving element 101 to produce spots (high luminance spots generated by a scanning beam of light) 102, 103 respectively on the forward moving path and the backward moving path.

As a result, it is possible to detect the positions of the deflected beams of light at a given clock time for each by observing the distribution of the total quantity of the electric charge induced by light on the light receiving element 101.

Thus, the relative positional displacement of the modulated spots can be gauged by means of the light receiving element 101 that is adapted to output a signal that allows the gap between the spots 102, 103 to be gauged on the light receiving element 101.

Second, the light receiving element 101 that is adapted to output a signal that allows the gap to be gauged on the element itself will be discussed.

The light receiving element 101 of this embodiment is required to detect the position of each modulated and deflected beam of light as positional information and also the gap separating the positions of two deflected beams of light.

A line sensor (image sensor) comprising a plurality of light receiving regions 105 can be used for the light receiving element 101 of this embodiment. Such an arrangement requires each light receiving region to comprise a light receiving element section that operates as photoelectric transducer, an accumulating section for accumulating the electric charges that are obtained as a result of photoelectric conversion and a transfer section for transferring the accumulated electric charge.

Then, the position of a deflected beam of light can be accurately identified because each of the plurality of light receiving regions can detect the quantity of the deflected beam of light.

Then, it is not necessary to transfer the accumulated electric charge at a high rate corresponding to the scanning speed. Rather, the electric charge can be transferred at a lower rate after the formation of modulated spots on the forward and backward moving paths on the light receiving element 101. Therefore, the relative positional displacement of the modulated spots can advantageously be detected if the scanning speed v is raised on the light receiving element 101 (e.g., if the period of application of a waveform is reduced).

When such a light receiving element is used, the distribution of quantity of light in each of the modulated spots on the light receiving element 101 is accumulated in the form of electric charge and output as positional information on each of the plurality of light receiving regions 105. Thus, this embodiment is free from the problem of a reduced accuracy of detection that arises to the method of directly detecting the scanning (deflection) timing because of changes in the delay of the detection circuit. Hence, this embodiment can highly accurately detect the relative positional displacement of the modulated spots.

This embodiment employs a method of detecting the forwardly moving modulated and deflected beam of light and the backwardly moving modulated and deflected beam of light by means of a light receiving element and gauging the change in the timing of forward scanning and backward scanning as positional information by referring to the respective scanning positions at a given clock time for each. Therefore, there does not arise any problem of lowered detection accuracy that can be caused by a delay in the detection circuit of the prior art and hence it is possible to highly accurately detect any change in the scanning condition.

Next, the method of controlling the detected relative positional displacement between of the forwardly moving and backwardly moving deflected beams of light so as to keep it to a constant value will be discussed.

Figure 5:
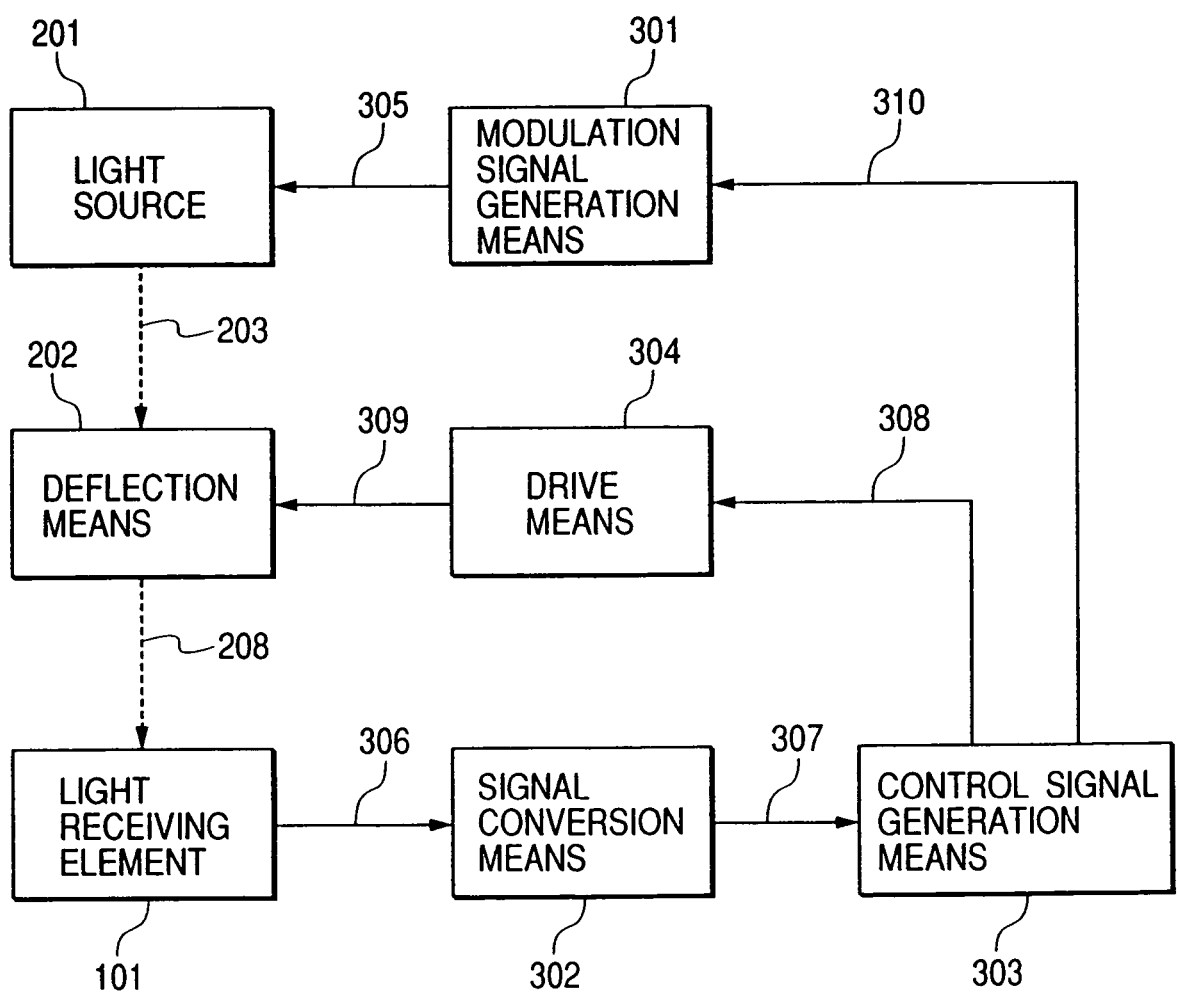
FIG. 5 is a schematic block diagram of the first embodiment of optical deflector, illustrating the control flows thereof.

FIG. 5 is a schematic block diagram of this embodiment of optical deflector, illustrating the control means thereof.

In FIG. 5, there are shown a deflected beam of light 208, a modulation signal generation means 301 for the light source 201, a modulation signal 305 for the light source 201, a detection signal 306 from the light receiving element, a signal conversion means 302, a scanning position displacement signal 307, a control signal generation means 303, a control signal 308 for the deflection means 202, a drive means 304 for the deflection means 202, a drive signal 309 for the deflection means 202 and a modulation control signal 310 for the light source 201.

The light source 201 is driven to turn on and off repeatedly (for modulation) by a modulation signal 305 from the modulation signal generation means 301 that operates to turn on and off the light source 201 with a predetermined period. The modulated beam of light 203 is deflected by the deflection means 202 and detected by the light receiving element 101. The modulation signal 305 is generated so as to detect modulated spots 102, 103 respectively in the forward scanning direction and in the backward scanning direction. The information on the modulated spots in the forward and backward scanning directions detected by the light receiving element 101 is transmitted to the signal conversion means 302 as output signal 306.

The signal conversion means 302 computationally determines the relative positional displacement between the scanning positions of the forwardly moving modulated beam of light and the backwardly moving modulated beam of light on the basis of the detection signal 306 from the light receiving element and outputs a scanning position displacement signal 307 that represents the relative displacement of the scanning positions of the modulated and deflected beams of light.

The control signal generation means 303 modifies either the control signal 308 for the deflection means 202 or the modulation control signal 310 for the light source 201 in such a way that the relative positional displacement of the scanning positions of the modulated and deflected beams of light becomes equal to a predetermined value (e.g., 0) on the basis of the scanning position displacement signal 307.

The control signal 308 of the deflection means 202 is adapted to change the rate at which the movable plate swings in order to change the timing of deflection of the mirror (movable plate) that belongs to the deflection means 202.

The drive means 304 selects a timing or period for the drive signal according to the control signal 308 and applies the drive signal 309 to the deflection means 202, or the deflector.

The modulation control signal 310 for the light source 201 is adapted to adjust the timing or period of the modulation signal 305 so that the modulation of light may be in harmony with the deflection timing of the mirror (movable plate) that belongs to the deflection means.

It may be so arranged to change either the control signal 308 for the deflection means 202 or the modulation control signal 310 for the light source 201 or both of them.

Thus, this embodiment of optical deflector can control the relative positional displacement between the forwardly scanning beam of light and the backwardly scanning beam of light so as to keep it a constant level by detecting the modulated and deflected beams of light by means of a light receiving element.

Thus, by using the above described detection/control method, there is provided a method of driving an optical deflector having a deflection means for deflecting a modulated beam of light from a light source, the method comprising:

a gauging step of gauging the distance between the position of a deflected beam of light moving on a light receiving element in a direction and the position of another deflected beam of light moving in the opposite direction; and a control step of controlling either the light source or the deflection means so as to make the distance take a predetermined value by a control means.

This embodiment is not limited to the above described configuration and may be modified in various different ways as will be described below.

For instance, it may be so arranged as to transfer the accumulated electric charge after generating a forwardly moving modulated spot on the light receiving element 101, generate a backwardly moving modulated spot after the transfer and subsequently resume the transfer of electric charge. With this arrangement, the scanning operation of the deflection means needs to be stabilized within a short period of time (which is at least twice as long as the time required for transferring the electric charge). Then, the forwardly moving modulated spot and the backwardly moving modulated spot can be detected separately and hence it is possible to use a simplified algorithm to detect the positional displacement.

While zero is used above as exemplary value for defining the relative positional displacement between the forwardly moving modulated spot and the backwardly moving modulated spot for this embodiment, another appropriately selected value may alternatively be used. Then, the forwardly moving modulated spot and the backwardly moving modulated spot are separated from each other so that they may be detected with ease.

While the light receiving element 101 is arranged on the scanning trajectory in the above-described embodiment, it may alternatively be arranged at some other position and a mirror may be additionally provided so as to reflect the deflected beams of light moving on the scanning trajectory. Then, the light receiving element 101 detects the deflected beams of light that have been reflected by the mirror. The provision of a mirror alleviates the positional restrictions imposed on the light receiving element 101 so that an optical deflector of this embodiment can be downsized.

While only a single light source is used in this embodiment, the present invention is applicable to an optical deflector having a plurality of light sources. Only one of the plurality of light sources may be used for the purpose of the invention.

Any light source that is adapted to modulate the beam of light emitted from it can be used for this embodiment. Examples of such light sources include semiconductor lasers, LEDs, solid lasers and gas lasers having a modulation means such as AOM.

While this embodiment is described above in terms of one-dimensional optical scanning where a forwardly moving deflected beam of light and the backwardly moving deflected beam of light pass along a same trajectory, the present invention is also applicable to so-called two-dimensional optical scanning where the backwardly moving deflected beam of light proceeds along a trajectory that is perpendicularly separate from the trajectory along which the forwardly moving deflected beam of light proceeds.

This embodiment is described above in terms of deflected beams of light adapted to one-dimensional scanning. However, this embodiment can be used for an exposure device adapted to emit light onto the cylindrical photosensitive body of an electrophotography-type image forming apparatus so as to produce an electrostatic latent image by two-dimensionally scanning the surface of the photosensitive body by means of deflected beams of light when the deflected beams of light are made to scan the revolving cylindrical photosensitive body along the longitudinal direction thereof.

This embodiment can also be used for a projection-type image display apparatus such as a projector when the deflected beams of light are made to scan two-dimensionally.

In such an image forming or image display apparatus, the light is turned on and off corresponding to the pixels of the image being produced. The size of each pixel is not particularly limited. In other words, it is defined according to the image to be produced by the apparatus. In each pixel, not only the actual scanning spot diameter but also its shape change as a function of the scanning distance because the scanning spot moves in one direction while the light source is on, though the change depends on the scanning speed. If a light source whose quantity of light differs between the center of light emitting point and the peripheral area (e.g., to show a Gaussian distribution) is used, the practical pixel size may be regarded to be equal to that of the region where a large quantity of light is found (e.g., a half of the largest quantity of light or $1/e^2$) is found regardless if the pixel moves in one direction while the light source is on. In the case of a projector, for example, that produces an image that human eyes can directly watch, the size of the pixel that moves while the light source is on may be defined as such, taking the human vision into consideration.

With this embodiment of optical deflector, the relative positional displacement of the forwardly moving modulated pattern and the backwardly moving modulated pattern can be eliminated on the projection surface (that is scanned by beams of light) without being influenced by the change in the scanning timing of the deflection means 202 when the relative positional displacement of the forwardly moving deflected beam of light and the backwardly moving deflected beam of light that are moving on the light receiving element is so controlled as to show a constant value.

Thus, when this embodiment is used for an exposure device adapted to emit light onto the photosensitive body of an electrophotography-type image forming apparatus or a display apparatus of the above-described type that is adapted to display an image on a two-dimensional display screen, it can display a desired image by using both a forwardly moving scanning beam of light and a backwardly moving scanning beam of light to improve the exposure rate or the display speed, whichever appropriate.

(Second Embodiment)

This embodiment differs from the first embodiment in terms of the method for identifying the position (central position) of each of the modulated and deflected beams of light (modulated spots) on the light receiving element 101 comprising a plurality of light receiving regions 105. Otherwise, this embodiment is identical with the first embodiment.

Figure 6A:
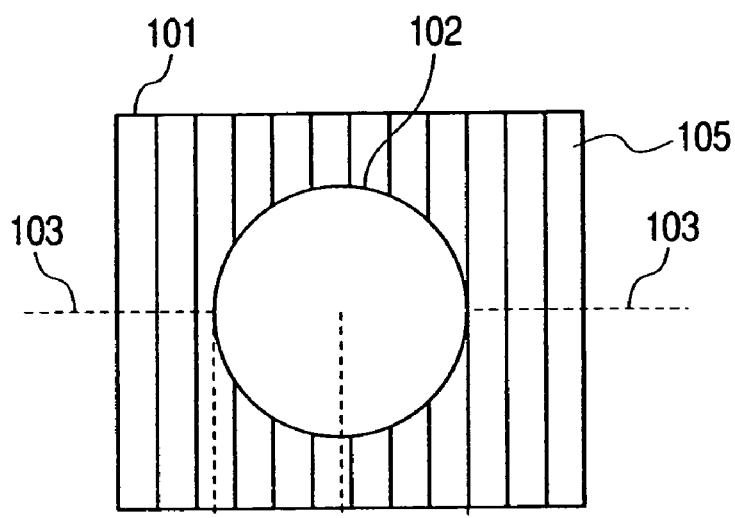
FIGS. 6A, 6B and 6C are schematic illustrations of the second embodiment.
Figure 6B:
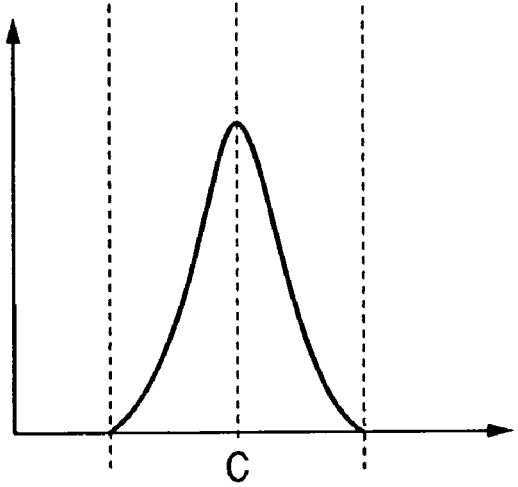
Figure 6C:
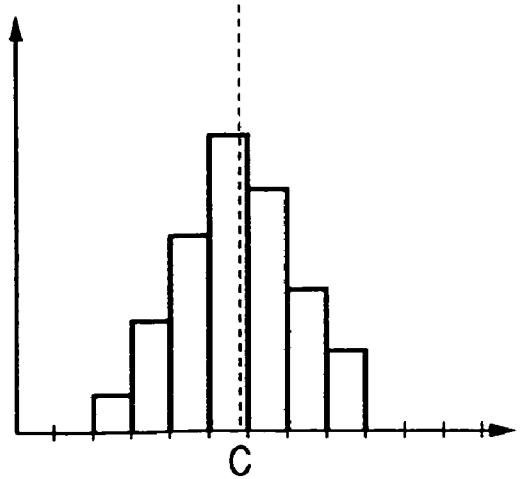

FIGS. 6A, 6B and 6C are schematic illustrations of the second embodiment.

FIG. 6A shows the positional relationship of the position on the light receiving element 101 where a modulated spot is formed and the plurality of light receiving regions 105. Note that the scanning direction is horizontal on FIG. 6A.

For the purpose of simplicity, assume here that there is a single modulated spot on the light receiving element 101. For the purpose of the invention, the process that is described below may be repeated for the number of times that is equal to the number of spots that is involved in the optical deflector.

FIG. 6B is a graph illustrating the distribution of quantity of light irradiated onto the light receiving element 101 when the positional relationship of FIG. 6A is applicable. In FIG. 6B, the horizontal axis represents the position on the light receiving element and the vertical axis represents the quantity of light. The modulated spot shows a distribution pattern that is symmetrical relative to position C where the quantity of light is largest (which may be a Gaussian distribution pattern in which the center is light and the peripheral area is dark).

FIG. 6C shows the signals that are detected in the plurality of light receiving regions 105 when the positional relationship of FIG. 6A is applicable. In FIG. 6C, the horizontal axis represents the position of each of the plurality of light receiving regions that corresponds to a selected position on the light receiving element and the vertical axis represents the magnitude of the detected signal. In the following description, the width of each of the plurality of light receiving regions that runs in the scanning direction is assumed to be w and the quantity of light detected on the n-th light receiving region from the left end in FIG. 6B is assumed to be Pn.

Two position identifying methods will be described below by referring to FIGS. 6A through 6C.

With the first position identifying method, a positional coordinate system is defined on the basis of the light receiving region that obtained the largest quantity of light in the plurality of light receiving regions. For example, in the case of FIG. 6C, the 5th light receiving region takes the role of the basis of a positional coordinate system and the center of the modulated spot is detected so as to be located at the position of $[(5-0.5)\times w]$.

The detection accuracy is determined by the relationship between the scanning velocity v on the light receiving element 101 and the width w of each of the plurality of light receiving regions 105 that runs in the scanning direction. If the scanning velocity v is constant, the detection accuracy rises as the width w of each of the plurality of light receiving regions that runs in the scanning direction is reduced.

With the first position identifying method, a simple process can be used to identify a particular position on the light receiving element so that both the time necessary for the process and the load borne by the components responsible for the process can be reduced. Additionally, the detection accuracy can be improved by reducing the width w of each of the plurality of light receiving regions 105 that runs in the scanning direction.

With the second position identifying method, a position on the light receiving element is identified on the basis of the distribution of detection signals obtained on the plurality of light receiving regions. The distribution of quantity of light of the modulated spot detected on the light receiving element can be regarded to be symmetrical relative to position C where the quantity of light is largest. Thus, if the position C where the quantity of light is largest does not agree with the center of one of the plurality of light receiving regions 105 or the boundary of one of the light receiving regions 105, the detection signals from the light receiving regions 105 are arranged asymmetrically (see the detection signals of FIG. 6C as an example). Using this phenomenon, the positional coordinate of each of the light receiving regions [(n−1)×w] is multiplied by the quantity of received light Pn and the products of the multiplications are added to obtain the total sum [Σ(n−1)×w×Pn]. Then, the total sum is divided by the total quantity of received light [ΣPn] in the light receiving region where the spot exists ([Σ(n−1)×w×Pn]/ΣPn) to identify the positional coordinate. Thus, it is now possible to detect the center of the spot with a level of error smaller than the width w of each of the plurality of light receiving regions. With this method, it is preferable that the deflected beam of light extends on more than one plurality of light receiving regions 105 from the viewpoint of identifying the position of the deflected beam of light. This method can be used when the position C where the quantity of light is largest does not agree with the center of one of the plurality of light receiving regions 105 or the boundary of one of the light receiving regions 105.

With the above described second method, it is possible to provide a resolution that is smaller than the width w of each of a plurality of light receiving regions 105 so that the position of the modulated spot can be identified highly accurately if a light receiving element 101 in which the width w of each of a plurality of light receiving regions 105 is relatively large (smaller than the width of the modulated spot to be detected) is used.

(Third Embodiment)

This embodiment differs from the first and second embodiments in that the light receiving element 101 has a plurality of light receiving regions 105 that are two-dimensionally arranged. Otherwise, this embodiment is identical with the first and second embodiments.

Figure 7:
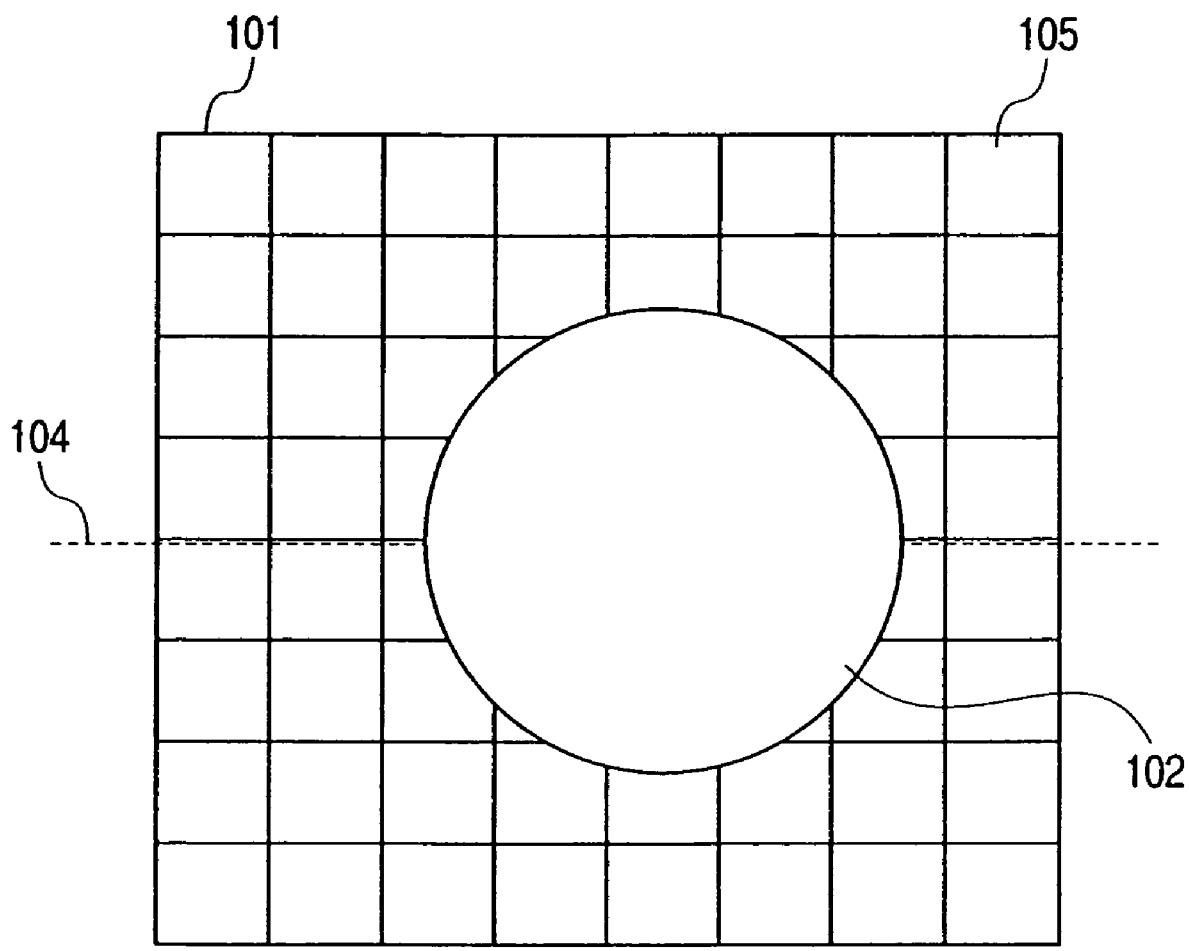
FIG. 7 is a schematic illustration of a plurality of light receiving elements that the light receiving element of the third embodiment includes.

FIG. 7 is a schematic illustration of a plurality of light receiving elements that the light receiving element of the third embodiment includes.

As shown in FIG. 7, the light receiving element 101 has a plurality of light receiving regions 105 that are arranged two-dimensionally. In other words, the light receiving regions 105 have a square profile and are arranged in rows and columns.

When a plurality of light receiving regions 105 are arranged two-dimensionally as in the case of this embodiment, the distribution of quantity of light of a modulated spot can be detected two-dimensionally so that the profile of the modulated spot can be grasped accurately and a large quantity of data can be used for selecting either of the position identifying methods described above in terms of the second embodiment.

Thus, the position of the modulated spot can be identified highly accurately by using this embodiment.

The light receiving element 101 of this embodiment can be realized by using a general purpose CCD area sensor or CMOS area sensor that finds applications in imaging operations so that it is not necessary to design a particular sensor for the light receiving element 101. Thus, this embodiment can be realized at low cost.

While the light receiving element of this embodiment has a plurality of light receiving regions having a square profile and arranged in rows and columns in the above description, it may alternatively have a configuration where a plurality of light receiving regions are arranged to show a honeycomb, a configuration where the rows or the columns of light receiving regions are alternately indented and offset in the direction of the trajectory or in a direction perpendicular to the trajectory, whichever appropriate, or a configuration where the light receiving regions have a circular, parallelogramic, triangular, rhombic, trapezoidal or polygonal profile.

(Fourth Embodiment)

In this embodiment, deflected beams of light entering the light receiving element is converged by a lens. Otherwise, this embodiment is identical with the preceding first through third embodiments.

Figure 8:
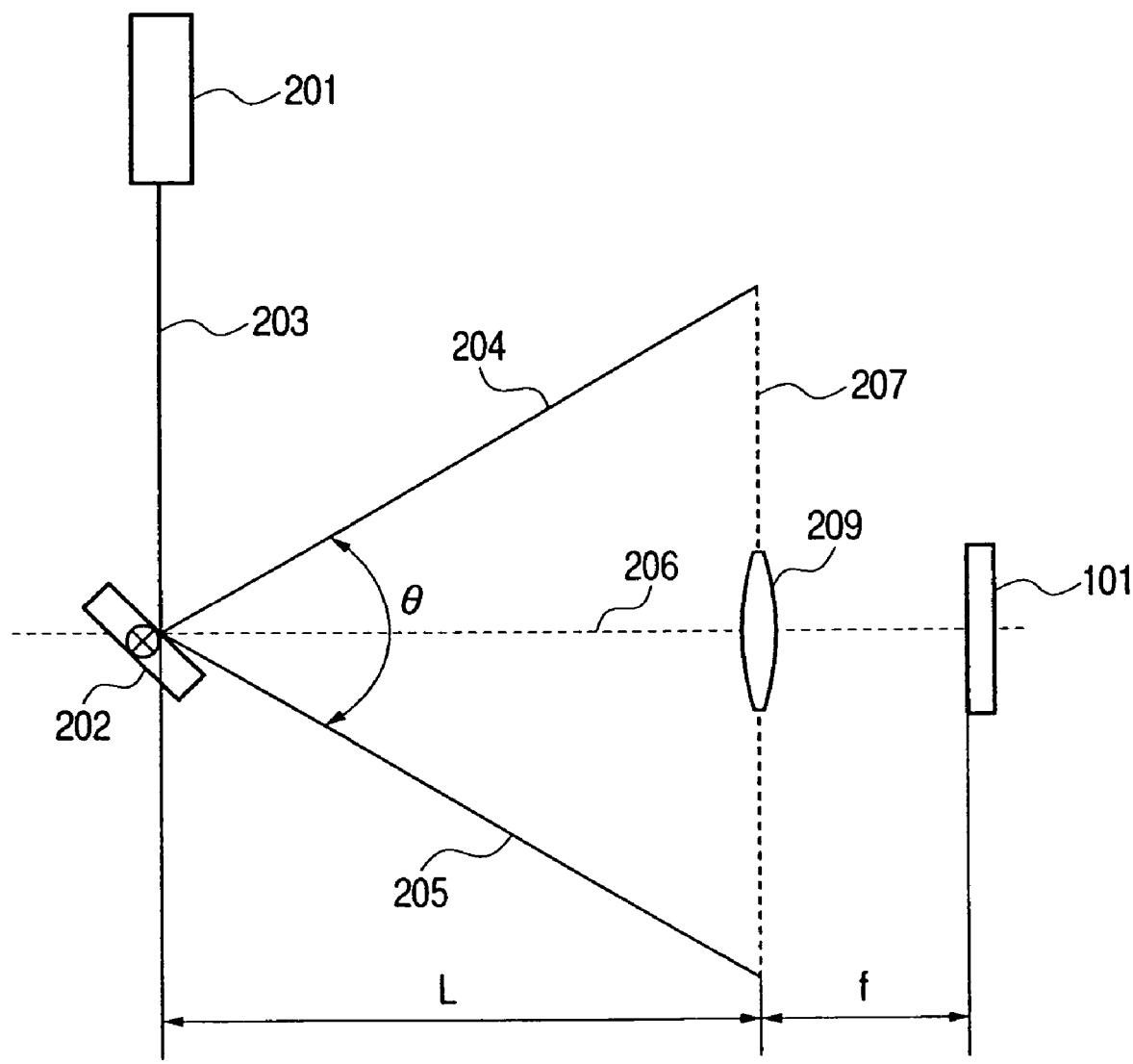
FIG. 8 is a schematic cross sectional view of the fourth embodiment of optical deflector taken along a plane containing a beam of light deflected by the deflection means.

FIG. 8 is a schematic cross sectional view of the fourth embodiment of optical deflector taken along a plane containing a beam of light deflected by the deflection means. In FIG. 8, reference symbol 209 denotes a lens.

The lens 209 is arranged at a position separated from the deflection means by distance L. The light receiving element 101 is arranged at a position separated from the lens 209 by a distance equal to the depth of focus f of the lens 209. The beam of light deflected by the deflection means 202 shows a reduced width (diameter) when it is converged by the lens to form a modulated spot. Additionally, the beam of light is further deflected by the lens so that the center of the modulated spot is shifted from that of the modulated spot of the first embodiment.

The relationship between the scanning position h and the angle of deflection θt at time t is expressed by the formula below.

$$h = f \times \tan(\theta t) \qquad (2)$$

From the equation (2), it will be seen that the scanning velocity v on the light receiving element 101 can be raised by selecting a large depth of focus f for the lens 209 regardless of the distance L. Then, the rate of change of the relative positional displacement of the forwardly moving modulated spot and the backwardly moving modulated spot is raised to improve the detection accuracy.

Additionally, the positions of the modulated spots do not depend on the distance L. Therefore, the arrangement of the related components is facilitated and the embodiment can be downsized when a small value is selected for the distance L and a lens 209 having a large depth of focus f is used.

The lens may be used as a component of this embodiment of optical deflector. Alternatively, the lens may be integrally arranged with the light receiving element.

The light receiving element 101 can accurately identify the positions of the deflected beams of light when the deflected beams of light are converged onto the light receiving element 101 by means of a lens 209 as in this embodiment. Additionally, the entire optical deflector can be downsized.

(Fifth Embodiment)

This embodiment differs from the first embodiment in that it comprises a deflection means 202 that utilizes a resonance phenomenon. Otherwise, this embodiment is identical with the first embodiment.

When a resonance-type deflector is used for the deflection means 202, it is possible to provide a wide angle of deflection by making the mechanical resonance frequency fc of the resonance-type deflector and the drive frequency fd agree with each other if the drive energy is not raised. However, the mechanical resonance frequency fc of the deflector can change remarkably as a function of the change in the environmental factors of the deflector including ambient temperature and therefore the scanning (deflecting) timing of the deflector 202 changes.

Therefore, it is necessary to control the resonance frequency fc of the resonance-type optical deflector and the drive frequency fd so as to make them agree with each other.

Figure 9A:
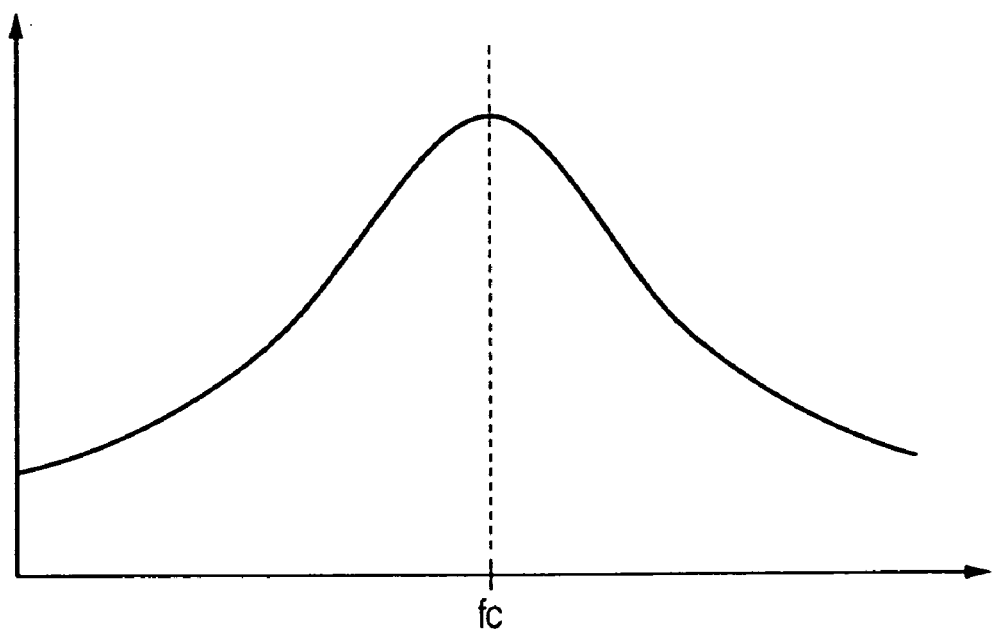
FIGS. 9A and 9B are graphs illustrating the frequency characteristics of the resonance-type deflector of the fifth embodiment of optical deflector.
Figure 9B:
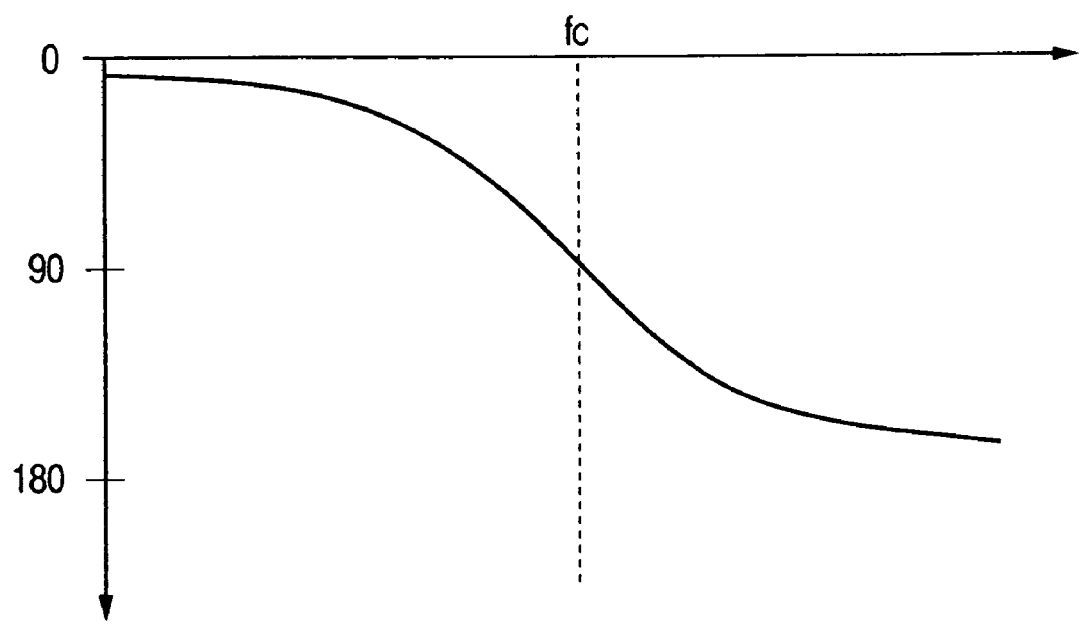

FIGS. 9A and 9B are graphs illustrating the frequency characteristics of the resonance-type deflector of the fifth embodiment of optical deflector.

In FIG. 9A, the horizontal axis represents the frequency fd of the drive signal for swinging the resonance-type deflector and the vertical axis represents the amplitude of the change in the angle of deflection (swinging angle) (largest angle of deflection θ) of the resonance-type deflector. In FIG. 9A, the frequency that provides the largest value for the largest angle of deflection θ is the resonance frequency fc (in an ideal case where any delay in the drive circuit and/or some other circuits does not need to be taken into consideration).

In FIG. 9B, the horizontal axis represents the frequency fd of the drive signal for swinging the resonance type deflector Oust like the horizontal axis of FIG. 9A) and the vertical axis represents the phase delay from the synchronizing signal of the drive frequency fd. Note that the origin (0 deg) on the horizontal axis of the phase delay can change depending on how the synchronizing signal of the drive frequency fd is generated.

As seen from FIGS. 9A and 9B, the phase changes as the drive frequency fd and the resonance frequency fc vary and hence the timing of scanning changes in a resonance-type optical deflector.

The relationship between the two graphs is maintained when the resonance frequency fc of the deflector is constant. The relationship between the graphs of FIGS. 9A and 9B is maintained if the resonance frequency fc changes (the profiles of the curves including the slopes and the widths of the curves are held similar) and only the parameter of the drive frequency fd represented by the horizontal axes of FIGS. 9A and 9B changes.

Thus, it is possible to make the drive frequency fd and the resonance frequency fc agree with each other by driving the resonance-type deflector with a drive frequency fd that constantly maintains (by changing the drive frequency to maintain) a same scanning timing (phase).

The influence on the phase (scanning timing) increases as the value of the drive efficiency (Q value of resonance) rises, if the frequency difference remains the same. Therefore, it is necessary to change the frequency at a smaller pitch.

Thus, in this embodiment, it is possible to constantly maintain the same scanning timing by detecting the relative positional displacement of the forwardly moving modulated beam of light and the backwardly moving modulated beam of light and controlling the drive frequency fd so as to make it follow the resonance frequency fc of the resonance-type optical deflector.

Figure 10A:
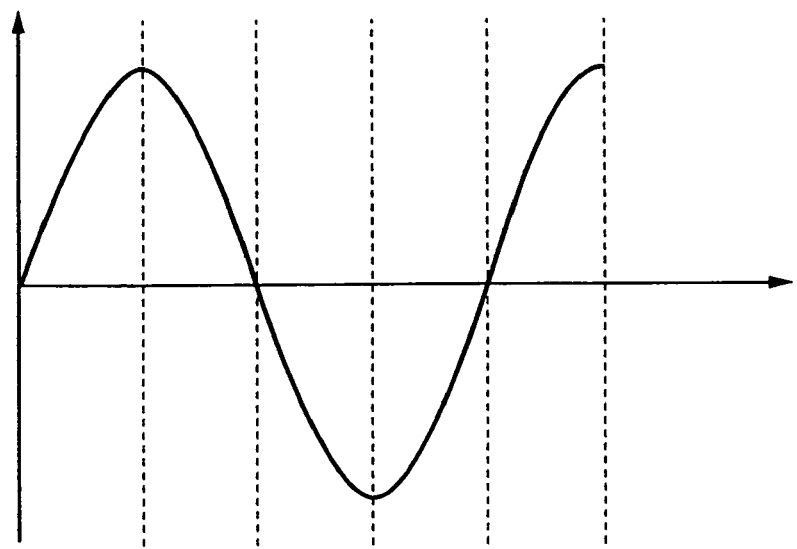
FIGS. 10A and 10B are graphs illustrating drive signal 309 of the deflection means 202 of the resonance-type deflector of the fifth embodiment of optical deflector and the change with time of the angle of deflection at the time when the drive signal 309 is applied.
Figure 10B:
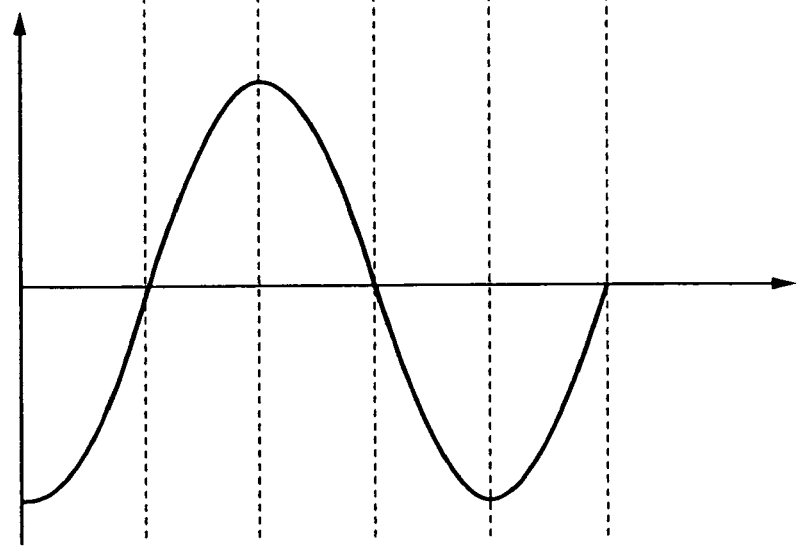

FIGS. 10A and 10B are graphs illustrating drive signal 309 of the deflection means 202 of the resonance-type optical deflector of the fifth embodiment and the change with time of the angle of deflection at the time when the drive signal 309 is applied.

FIG. 10A shows the temporal change of the amplitude (e.g., of the voltage) of the drive signal 309 of the deflection means 202. In FIG. 10A, the horizontal axis represents time and the vertical axis represents the amplitude of the drive signal 309.

In FIG. 10B, the horizontal axis represents time (just like the horizontal axis of FIG. 10A) and the vertical axis represents the angle of deflection θt of the deflection means 202 at time t.

If the drive signal shows a sinusoidal waveform and the drive frequency fd and the resonance frequency fc agree with each other as shown in FIG. 10A, a phase delay of 90 degrees occurs to the change of the angle of deflection θt as shown in FIG. 10B. A phase offset of 180 degrees can occur depending on the selection of the sense of deflection of the deflection means 202 (the definition of the positive side and the negative side for a slope inclined in a direction relative to the rotary axis).

When a resonance-type optical deflector is used, the angle of deflection θt changes with time to show a sinusoidal waveform even if the waveform of the drive signal is not sinusoidal but triangular, rectangular or saw-edged.

Therefore, since the scanning (deflection) time of the forwardly moving beam of light and that of the backwardly moving beam of light are equal to each other, the time that can be used for the modulating operation of the light source 201 is shortened (to less than a half of the available time) and the efficiency of the use of light is reduced if only one of the scanning beams of light is utilized. The modulating operation of the resonance-type optical deflector needs to be conducted by using both the forwardly moving beam of light and the backwardly moving beam of light in order to avoid the above identified problem.

With this embodiment, it is possible to maintain the relative displacement of the scanning position of the forwardly moving scanning beam of light and that of the backwardly moving scanning beam of light by using a resonance-type deflector for the deflection means 202. Thus, a resonance-type deflector that can produce a large angle of deflection at a low power consumption rate can be used for an application where both a forwardly moving scanning beam of light and a backwardly moving scanning beam of light are utilized. As a result, it is possible to provide an optical deflector whose power consumption rate is low and efficiency of utilization of light is high.

While the drive frequency fd of this embodiment is made to agree with the resonance frequency fc in the above description, it is also possible to make the drive frequency fd and the resonance frequency fc to always show a constant difference and hence a certain constant relationship. If such is the case, the ratio of the change in the scanning timing relative to the frequency displacement becomes small to facilitate the operation of controlling the drive frequency fd so as to make it follow the resonance frequency fc.

(Sixth Embodiment)

This embodiment differs from the first through fifth embodiments in terms of the method for generating modulated spots and detecting their relative positional displacement and the method for detecting the relative positional displacement. Otherwise, it is identical with the preceding first through fifth embodiments.

Figure 11A:
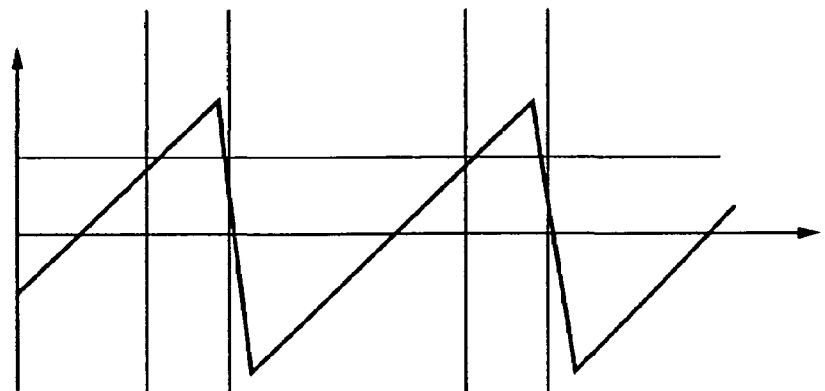
FIGS. 11A and 11B are schematic illustrations of a method of generating modulated spots by the sixth embodiment of optical deflector.
Figure 11B:
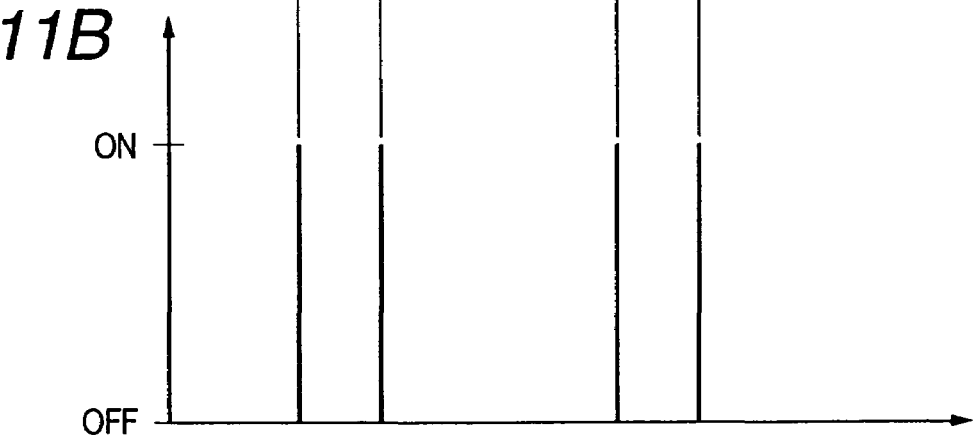

FIGS. 11A and 11B are schematic illustrations of a method of generating modulated spots by the sixth embodiment of optical deflector.

FIG. 11A shows a waveform that the drive signal 309 to be applied to the deflection means 202 can take. In FIG. 11A, the horizontal axis represents time and the vertical axis represents the amplitude of the applied signal. While the waveform of the drive signal is triangular, it is illustrated only as example.

FIG. 11B shows the modulation signal 305 to be used for modulating (turning ON and OFF) the light source 201. In FIG. 11B, the horizontal axis represents time (just like the horizontal axis of FIG. 11A) and the vertical axis represents the pattern of the modulation signal 305. Note that the modulation signal 305 is usually an OFF signal but it turns to be an ON signal when the light source 201 is modulated to generate a modulated spot on the light receiving element 101.

The modulation signal 305 produces an ON signal once for each time period, during which the deflection means 202 is driven to make both a forwardly moving beam of light and a backwardly moving beam of light scan on a plane containing the light receiving element 101, and generates modulated spots 102, 103, which are separated from each other, on the light receiving element 101.

Figure 12A:
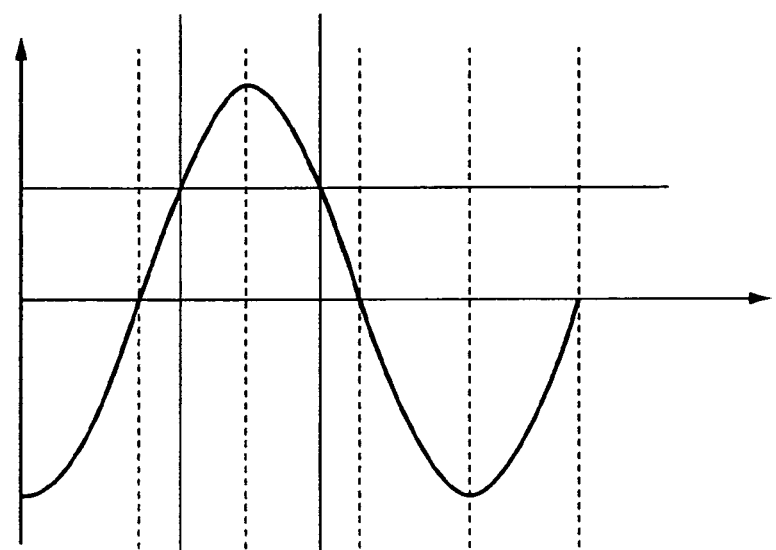
FIGS. 12A and 12B are schematic illustration of another method of generating modulated spots by the sixth embodiment of optical deflector.
Figure 12B:
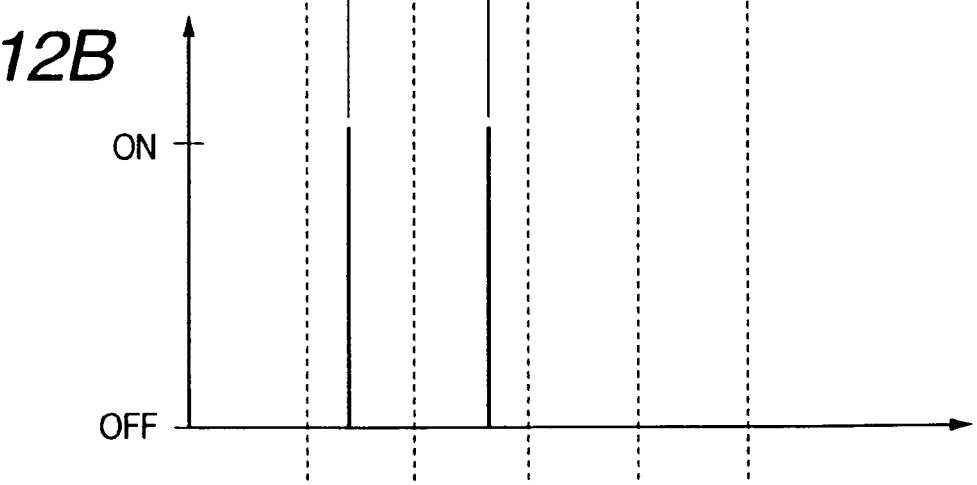

While the drive signal has a triangular waveform in the above description, some other waveform may alternatively be used. FIGS. 12A and 12B schematically illustrate a drive signal having a sinusoidal waveform that can be used for generating modulated spots (both the vertical axes and the horizontal axes of FIGS. 12A and 12B are identical with their counterparts of FIGS. 11A and 11B).

While only a single forwardly or backwardly moving modulated spot is generated in the above description, a plurality of forwardly or backwardly moving modulated spots may be alternatively be generated. When a plurality of modulated spots are detected by the light receiving element 101, the relative positional displacements are gauged and the average of the positional displacements is determined and used to improve the accuracy of detection.

When this embodiment of optical deflector is used for the exposure device of an image forming apparatus or an display device and the relative positional displacement of the forwardly moving modulated spot and the backwardly moving modulated spot is made to show a predetermined value (which may be equal to 0), they should be controlled to operate for exposure or display properly. Then, a high quality image is formed by using both forward scanning and backward scanning.

(Seventh Embodiment)

This embodiment differs from the first through sixth embodiments in that the optical deflector projects deflected beams of light two-dimensionally on the light receiving surface. Otherwise, it is identical with the preceding first through sixth embodiments.

Figure 13:
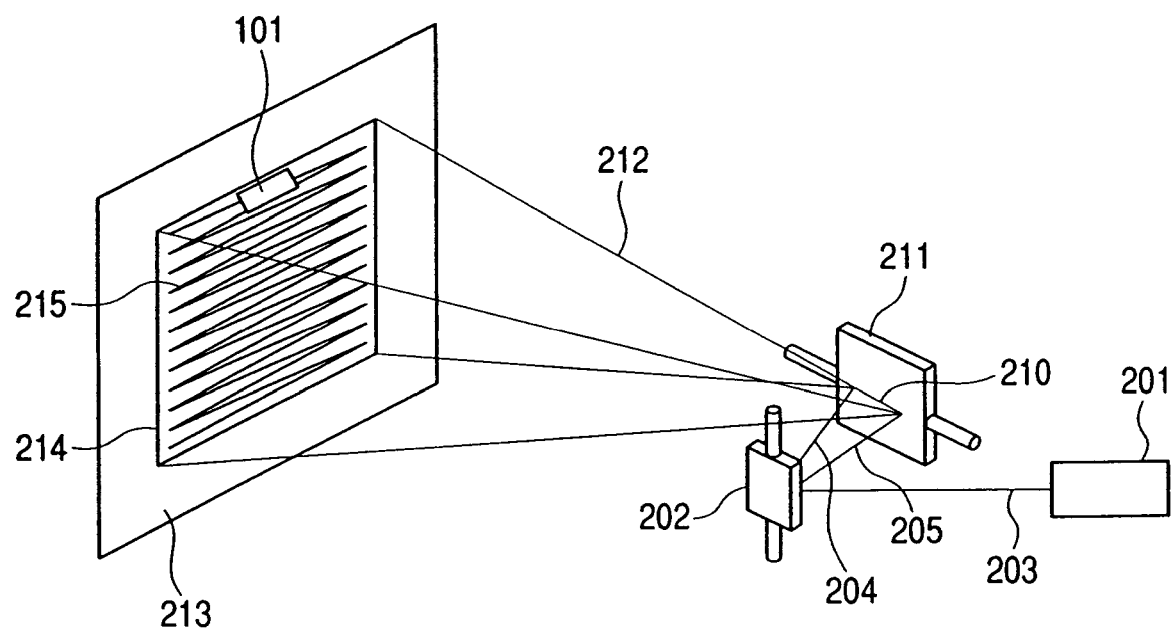
FIG. 13 is a schematic illustration of the seventh embodiment of optical deflector.

FIG. 13 is a schematic illustration of the seventh embodiment of optical deflector.

In FIG. 13, there are shown a second deflection means 211, a scanning trajectory 210 on the reflection plane of the second deflection means 211 formed by the deflection means 202, beams of light 212 deflected by the second deflection means 211, the scanning area 214 on a plane 213 in which deflected beams of light scan, and the trajectory 215 of scanning beams of light on the plane 213.

Note that the arrangement for controlling the operation of the optical deflector as shown in FIG. 5 is not illustrated in FIG. 13.

Each of the deflection means 202 and the second deflection means 211 is adapted to deflect each beam of light both horizontally and vertically. Therefore, the deflected beams of light produced by the deflection means cover a two-dimensional region.

The deflection means 202 and the second deflection means 211 have respective deflection velocities that are different from each other. More specifically, when the two deflection means are compared with each other in FIG. 13, the deflection means 202 deflects beams of light at relatively high speed (high frequency), whereas the second deflection means 211 deflects beams of light at relatively low speed (low frequency). The speed relationship may be inverted.

The deflection means that deflects beams of light at relatively high speed can display highly fine images when a resonance-type deflector is used. This is because a resonance-type deflector is adapted to high speed deflecting operations.

The beam of light 203 modulated by and emitted from the light source 201 is deflected by the deflection means 202, the largest angle of deflection being defined by beam of light 204 and beam of light 205 (the largest angle of deflection θ). The second deflection means 211 deflects the beams of light that scan the reflection plane along the trajectory 210 to produce beams of light 212 that scan the plane 213 arranged at a selected position so as to define a scanning area as indicated by 214. Note that reference symbol 215 denotes the schematically illustrated trajectory of scanning beams of light within the scanning area 214 on the plane 213.

The light receiving element 101 is placed at an appropriate position in the scanning area 214. More specifically, it is placed on a horizontal part of the scanning trajectory.

Figure 14:
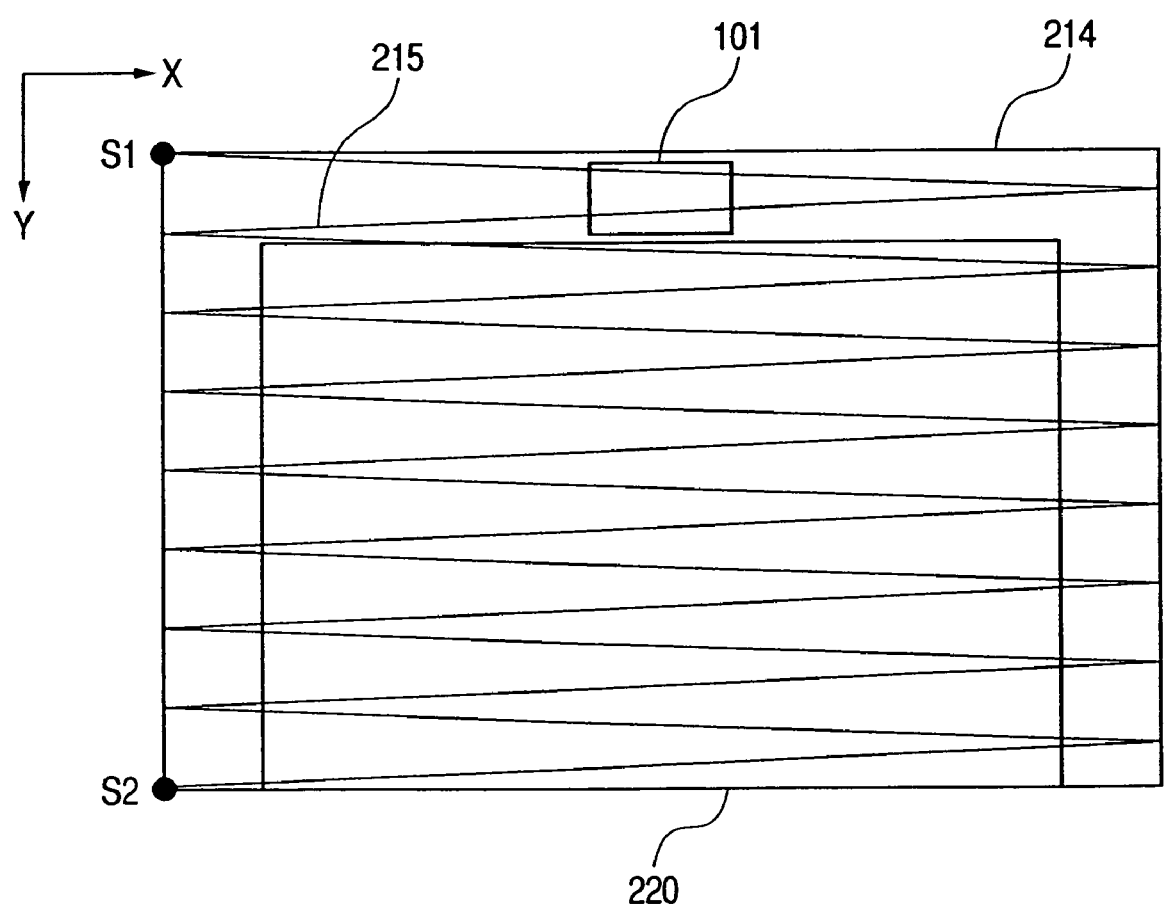
FIG. 14 is a schematic illustration of the light receiving element 101 arranged within a scanning area 214 and the display region of the seventh embodiment of optical deflector.

FIG. 14 is a schematic illustration of the light receiving element 101 arranged within the scanning area 214 and the display region of the light receiving element 101 of this embodiment.

In FIG. 14, reference symbol 220 denotes the display region to be used for forming images.

The scanning area 214 includes a display region 220 and a region where the light receiving element 101 is arranged. As deflected beam of light 212 starts scanning from scanning point S1, it moves back and forth in the horizontal scanning direction X to gradually scan from upper part of the scanning area to lower part of the area along the vertical scanning direction Y. When the deflected beam of light 212 gets to scanning point S2, it is returned to scanning point S1 and repeats the same scanning cycle.

It is so arranged that the deflected beam of light 212 moves on the light receiving element 101 that is placed on the scanning line 215.

With this embodiment of optical deflector that is applied to a two-dimensional image forming apparatus comprising a resonance-type deflector, the relative positional displacement of the modulated beams of light is detected by the light receiving element 101 and controlled to show a predetermined desired value while the modulated beams of light are forming an image. Thus, it is possible to display a high quality image by means of a resonance-type deflector that produces a forwardly moving beam of light and a backwardly moving beam of light.

While the light receiving element 101 is arranged within the scanning area 214 in the above description of the embodiment, scanning beams of light, or deflected beams of light between the deflection means 202 and the second deflection means 211, may be taken out from the scanning area 214 for detection by means of a reflector mirror.

While the region where the light receiving element 101 is arranged and the display region 220 are separated from each other in the above description of the embodiment, a region for arranging the light receiving element 101 or a reflector mirror to be used by the light receiving element 101 to detect modulated spots may be provided within the display region 220 so long as the light receiving element 101 or the reflector mirror does not visually adversely affect the displayed image.

The deflected beam of light 212 may be so adapted that it becomes bright only when it moves on the light receiving element 101. In other words, the deflected beam of light 212 is required to be bright at least on the part of the trajectory located on the light receiving element 101.

(Eighth Embodiment)

This embodiment of optical deflector is characterized in that it comprises a light receiving element 101. Otherwise, it is identical with the first through seventh embodiments.

Like the seventh embodiment, this embodiment of optical deflector is applied to an image forming apparatus and also comprises two deflection means that are driven to produce respective deflected beams of light for horizontal scanning and vertical scanning to display a two-dimensional image. Only the arrangement that differentiates this embodiment from the seventh embodiment will be discussed below.

Figure 15:
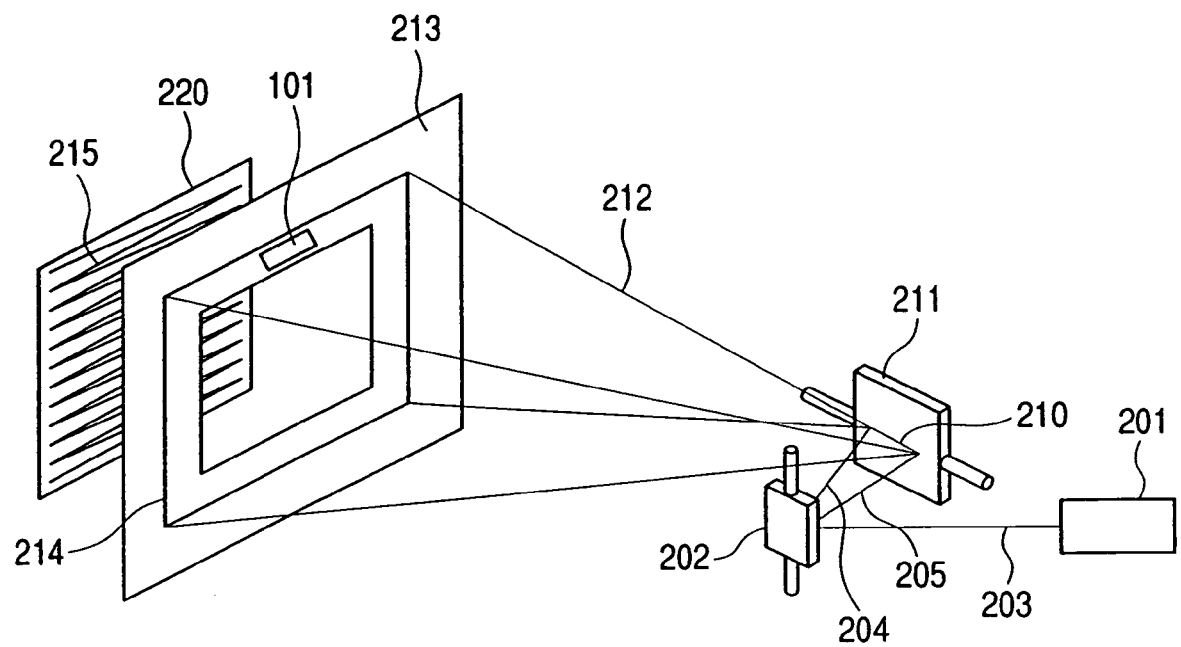
FIG. 15 is a schematic illustration of the eighth embodiment of optical deflector.

FIG. 15 is a schematic illustration of this embodiment of optical deflector.

In FIG. 15, there are shown a frame body 213, a scanning region 214 provided on the plane of the frame body, a display region 220 and the trajectory 215 of scanning beams of light in the display region.

The light receiving element 101 is arranged in the scanning region 214 on the frame body. Thus, the plane containing the display region can be separated from the plane carrying the light receiving element.

Additionally, because the distance L from the deflection means 202 to the light receiving element 101 and the distance from the central axis 206 of optical deflection to the position of the light receiving element 101 can be fixed, the timing of generating a modulation pattern can be computed with ease on the basis of the arrangement of the light receiving element.

This embodiment of optical deflector can be applied to an image display apparatus such as a projector of the front type with which the viewer watches the image formed in the display region 220 from a position located between the frame body and the image.

This embodiment allows to freely define the display region because the display region onto which an image is projected can be placed on any plane. In other words, the projector can be used with any plane because the plane on which an image is projected for displaying is not subjected to any restrictions.

This embodiment of optical deflector can be applied to an image display apparatus such as a rear projector when it is so arranged that the viewer watches the image formed in the display region 220 from the side opposite to the display surface of the display region 220.

Additionally, this embodiment can also be applied to an image display apparatus of the type adapted to display an image directly on the retinas of the viewer or a head-mount display type image forming apparatus.

While the frame body 213 is not an indispensable component of this embodiment of optical deflector, the provision of a frame body 212 is preferable because the light receiving element 101 can be aligned with ease when it is rigidly secured to the frame body 213.

The use of a frame body 213 is also preferable for defining the display region 220. Therefore, a frame body 213 on which the light receiving element 101 is arranged may be defined as an indispensable component of this embodiment.

While the term odulation pattern is used in the above description of the preferred embodiments, it will be paraphrased to odulation pattern for detection in the following description in order to discriminate it from a modulation pattern for drawing an image that is used for image formation.

As for the scanning direction of the deflection means, scanning from left to right on the light receiving element 101 in FIG. 2 is defined to be forwardly moving direction.

EXAMPLE 1

In Example 1, an optical deflector according to the invention is used for an exposure device adapted to emit light onto the photosensitive body of an electrophotography-type image forming apparatus.

Figure 16:
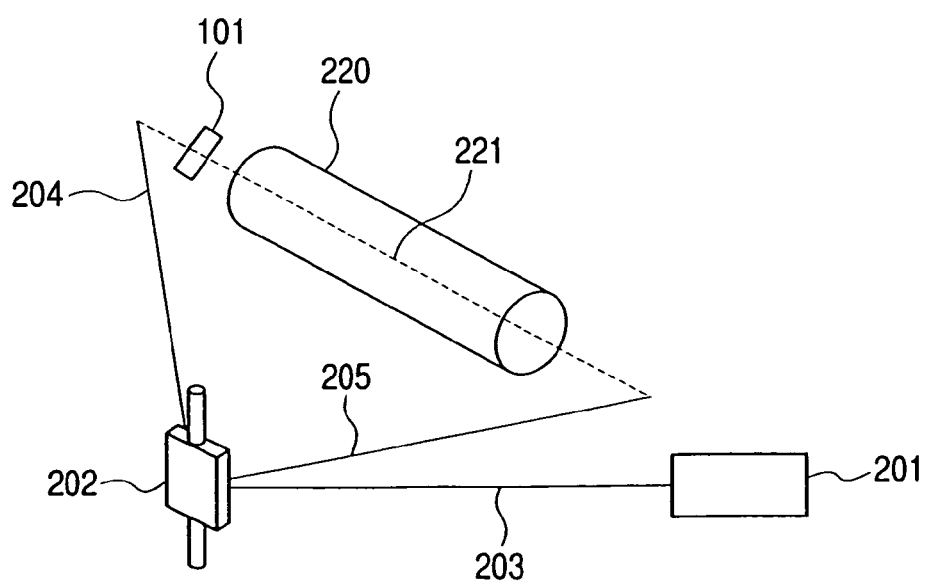
FIG. 16 is a schematic illustration of the configuration of the device of Example 1.

FIG. 16 is a schematic illustration of the configuration of the device of Example 1.

In FIG. 16, there are shown a light receiving element 101, a light source 201, a deflection means 202, a photosensitive drum 220, the axis 221 of the photosensitive drum that includes a trajectory of scanning, a beam of light 203 emitted from the light source 201 and beams of light 204, 205 that define the largest angle of deflection.

The beam of light 203 modulated by and emitted from the light source 201 is deflected by the deflection means 202 to produce deflected beams of light that scan forwardly and backwardly on the axis 221 respectively so as to form a desired modulation pattern on the photosensitive body within a scanning period and expose the photosensitive body to light. The largest angle of deflection and the arrangement of the light receiving element 101 are so selected as to make it possible to detect modulated spots on the light receiving element 101 (detect scanning beams of light outside the photosensitive body).

The light source 201 is directly modulated by means of an infrared semiconductor laser ($\lambda$=780 nm). The deflection means 202 is a galvano-mirror driven by a 10 kHz triangular wave. A ½ inch CMOS image sensor (black and white sensor conforming to the CIF Specifications) is used for the light receiving element 101.

The modulation pattern is defined such that modulated spots are formed on the light receiving element 101 as shown in FIG. 2. As shown in FIG. 2, the modulated spot that is scanning forwardly is located left to the modulated spot that is scanning backwardly and it is so arranged that the photosensitive body is exposed properly to the forwardly scanning beam of light and the backwardly scanning beam of light when the relative positional displacement of the modulated spots gets to predetermined value $L_g \pm \alpha$, where $\alpha$ is the tolerance for the accuracy of forward scanning and backward scanning of the photosensitive body.

The above operation is controlled by the arrangement illustrated in FIG. 5.

Figure 17:
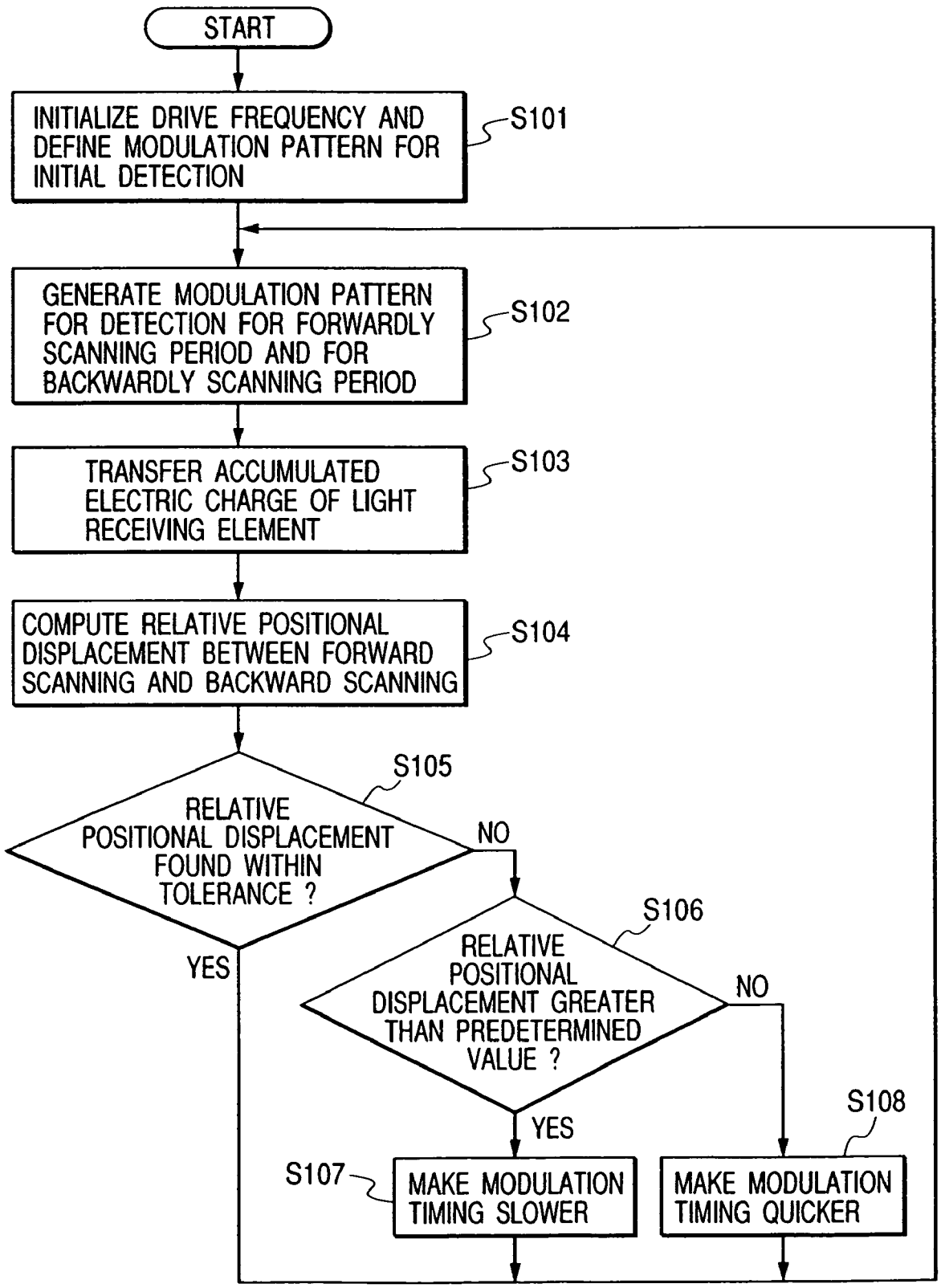
FIG. 17 is a flow chart of the operation of Example 1.

FIG. 17 is a flow chart of the operation of this example.

As the control starts, firstly an initial drive frequency and an initial modulation pattern for detection are defined (S101). Firstly, the deflection means 202 is driven on the basis of the above information to generate a modulation pattern for detection.

The modulation pattern for detection is generated on the light receiving element 101 in such a way that it is turned on once for a forward scanning period and once for a backward scanning period (S102). After the generation of the modulated spots, the electric charge accumulated in the light receiving element by the modulated spots is transferred in such a way that the electric charge in one of the plurality of light receiving regions is transferred at a time (S103).

Then, the relative positional displacement of the modulated spots is computed on the basis of the transferred information (S104) by using the method described above by referring to the second embodiment for the computation.

If the computed relative positional displacement is found within the predetermined range of Lg±α, the steps from S102 are repeated. If, on the other hand, it is not found within the predetermined range, it is determined if the relative positional displacement is greater or smaller than Lg (S106).

If the relative positional displacement is greater than Lg, it is because the modulation timing is too quick and hence the gap separating the forwardly scanning modulated spot and the backwardly scanning modulated spot is made too large. Therefore, the modulation timing is made slower (S107).

If, on the other hand, the relative positional displacement is smaller than Lg, it is because the modulation timing is too slow and hence the gap separating the forwardly scanning modulated spot and the backwardly scanning modulated spot is made too small. Therefore, the modulation timing is made quicker (S108).

When shifting the modulation timing, the positional relationship of the modulation pattern for detection and the modulation pattern on the photosensitive body is maintained so that only the timing is made quicker or slower.

Thereafter, the processing operation returns to S102 to repeat the above steps.

In this way, the relative positional displacement of the forwardly scanning modulated spot and the backwardly scanning modulated spot can be held within a predetermined range. Thus, there arises no displacement between exposure to the forwardly scanning modulated spot and exposure to the backwardly scanning modulated spot on the photosensitive body. In other words, the photosensitive body is exposed to light correctly and therefore, it is possible to realize an electrophotography-type image forming apparatus that produces fine images.

EXAMPLE 2

Example 2 differs from Example 1 in generation of modulation pattern for detection and the method of transferring the accumulated electric charge from the light receiving element. Otherwise, this example is identical with the preceding example.

Unlike in Example 1, a modulation pattern for detection is not generated for forward scanning and for backward scanning successively and the value of Lg is equal to 0 in this example. In other words, if the photosensitive body is exposed properly to the forwardly scanning modulated spot and the backwardly scanning modulated spot (and hence there is no relative positional displacement thereof), the position of the modulation pattern for detection for forward scanning agrees with that of the modulation pattern for detection for backward scanning.

Figure 18:
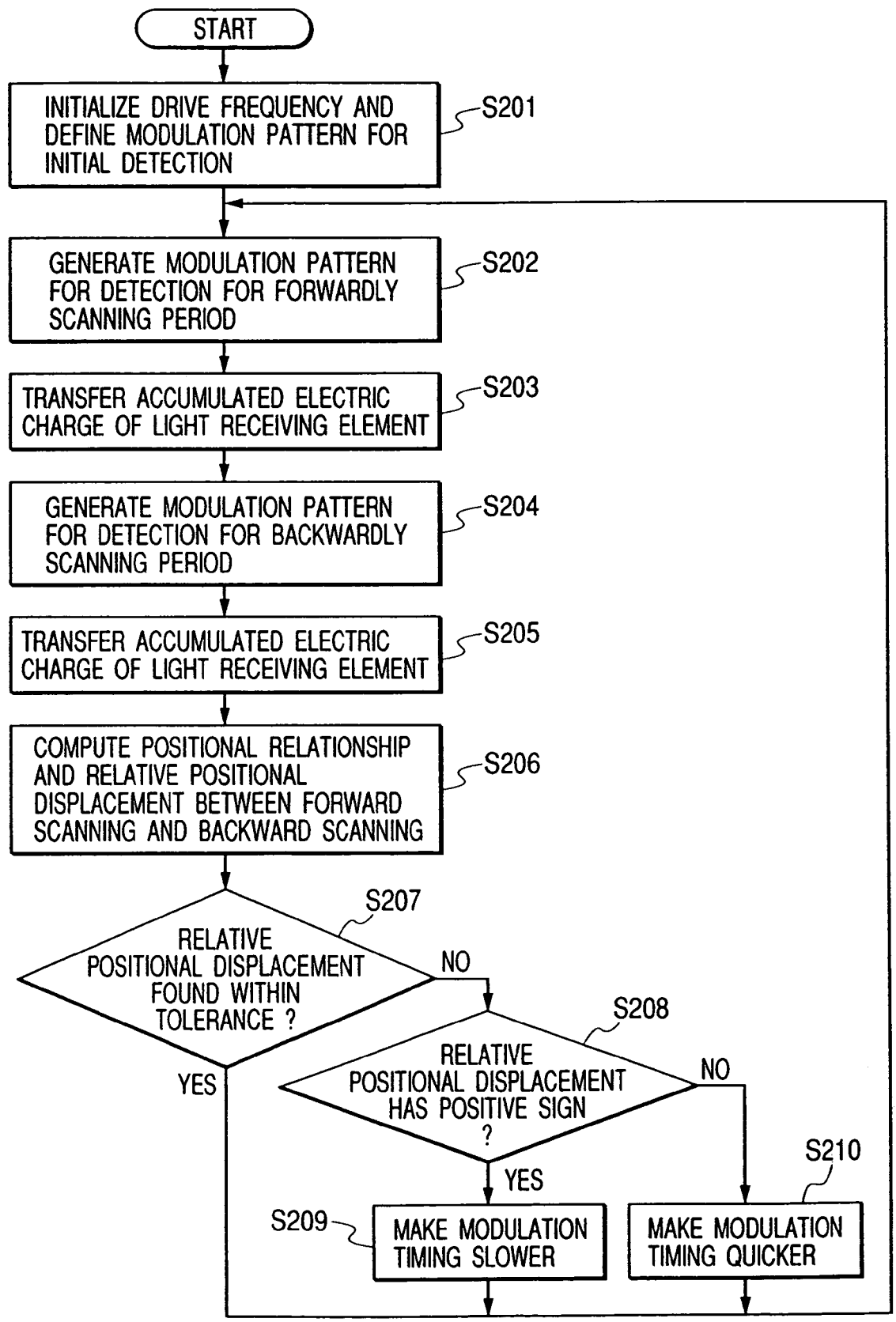
FIG. 18 is a flow chart of the operation of Example 2.

FIG. 18 is a flow chart of the operation of Example 2.

After initialization (S201), a single ON signal is generated as modulation pattern for detection in a forward scanning period and a modulated spot is generated on the light receiving element 101 (S202). Thus, only a modulated spot is generated at position 102 in FIG. 2. The electric charge accumulated by the modulated spot in the forward scanning period is transferred on a region by region basis (S203). Then, a single ON signal is generated as modulation pattern for detection in a backward scanning period and the accumulated electric charge is transferred (S204 and S205).

The positional relationship and the relative position displacement of the forwardly scanning modulated spot and the backwardly scanning modulated spot are computed from the obtained positional information of those spots (S206). If the position displacement is found within the tolerance ±α, the steps from S202 are repeated. If, on the other hand, the positional displacement is not found within the tolerance, the positional of the forwardly scanning modulated spot and that of the backwardly scanning modulated spot are compared. Note that, the relative positional displacement is defined to be positive when the forwardly scanning modulated spot is found to the left of the backwardly scanning modulated spot, whereas the relative positional displacement is defined to be negative when the forwardly scanning modulated spot is found to the right of the backwardly scanning modulated spot (S208).

If the positional displacement is positive, it is because the modulation timing is too quick and hence the forwardly scanning modulated spot is found to the left of the backwardly scanning modulated spot. Therefore, the modulation timing is made slower (S209).

If, on the other hand, the relative positional displacement is negative, it is because the modulation timing is too slow and hence the forwardly scanning modulated spot is found to the right of the backwardly scanning modulated spot.

Therefore, the modulation timing is made quicker (S210).

Thereafter, the processing operation returns to S201 to repeat the above steps.

In the case of this example, it is possible to separately detect the forwardly scanning modulated spot and the backwardly scanning modulated spot on a light receiving element 101 having only a small region. Thus, the light receiving element 101 can be downsized to reduce the cost of the entire apparatus.

A time lag occurs between the generation of the forwardly moving modulated spot for detection and that of the backwardly moving modulated spot for detection (time period required for transferring the accumulated electric charge). Therefore, the arrangement of this example may preferably be employed when a resonance type optical deflector whose scanning characteristics would not fluctuate in a short period of time is used for the deflection means 202.

EXAMPLE 3

In Example 3, an optical deflector according to the invention is used for a laser scanning projection type display apparatus.

Figure 19A:
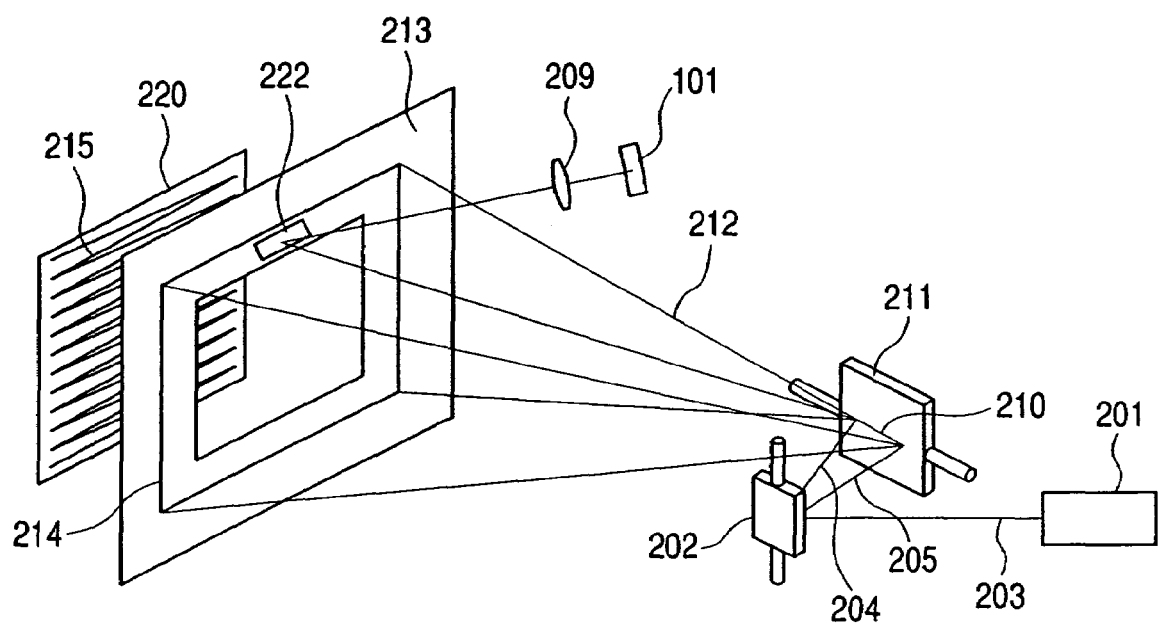
FIGS. 19A and 19B are schematic illustrations of the configuration of the apparatus of Example 3.

FIG. 19A is a schematic illustration of the configuration of the apparatus of this example.

In FIG. 19A, reference symbol 222 denotes a reflector mirror and reference symbol 209 denotes a converging lens. Otherwise, the configuration is identical with that of 8th Embodiment.

The light source 201 is directly modulated by means of a red semiconductor laser ($\lambda$=635 nm). The deflection means 202 drives the resonance type optical deflector having a resonance frequency of 28 kHz by means of a rectangular wave. A CMOS image sensor having 100×100 regions (each region is a 10 μm square) is used for the light receiving element 101. The galvano-mirror of the second deflection means 211 is driven by means of a saw-edged wave of a frequency of 60 Hz. The modulated spots on the light receiving element are substantial circles having a diameter of about 40 μmø.

The deflected beam of light reflected by the reflector mirror 222 is converged by the lens 209 to form a modulated spot on the light receiving element 101.

Figure 19B:
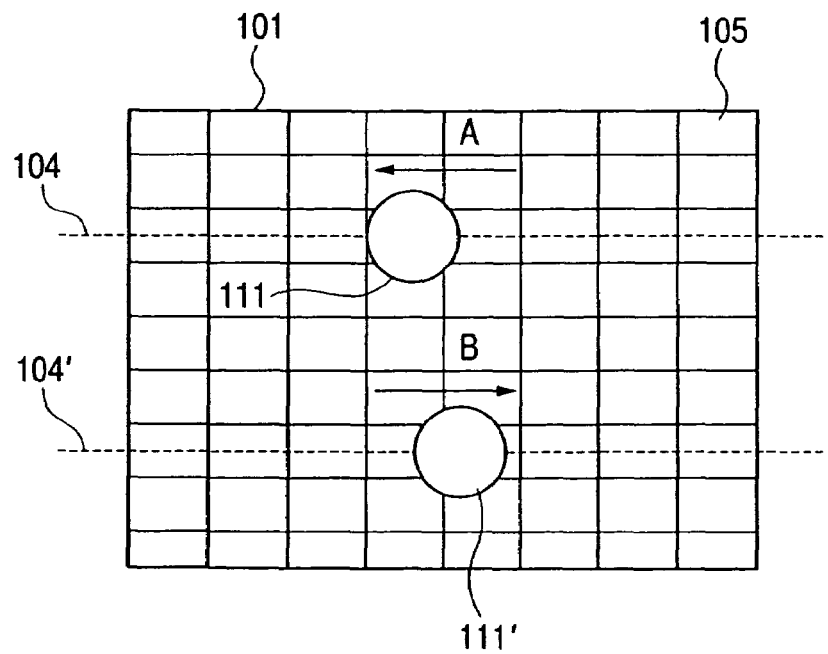

Modulation patterns are so defined that modulated spots are formed on the light receiving element 101 in a manner as shown in FIG. 19B. Since the apparatus is adapted to two-dimensional scanning, the trajectory 104 of the forwardly scanning modulated spot (scanning in direction A) and the trajectory 104 of the backwardly scanning modulated spot (scanning in direction B) are different from each other on the light receiving element 101 as shown in FIG. 19B. Therefore, the forwardly scanning modulated spot and the backwardly scanning modulated spot are separated from each other and hence can be recognized with ease. In the instance of FIG. 19B, it is possible to recognize that the upper modulated spot 111 is the forwardly scanning one, whereas the lower modulated spot 111 is the backwardly scanning one.

The gap between the two trajectories and their respective inclinations change depending on the positional arrangement of the light receiving element 101 and the method employed for two-dimensional scanning (scanning trajectories do not necessarily agree with the horizontal direction of the displayed image).

It is so arranged that an image is properly displayed on the projection surface by forward scanning and backward scanning when the positional displacement between the forwardly scanning modulated spot and the backwardly scanning modulated spot on the light receiving element 101 (in terms of horizontal coordinate on the light receiving element 101) is found within a predetermined range 0±α as shown in FIG. 19B, where α is the tolerance of accuracy for forward scanning and backward scanning for the image being displayed.

The above operation is controlled by the arrangement illustrated in FIG. 5.

Figure 20:
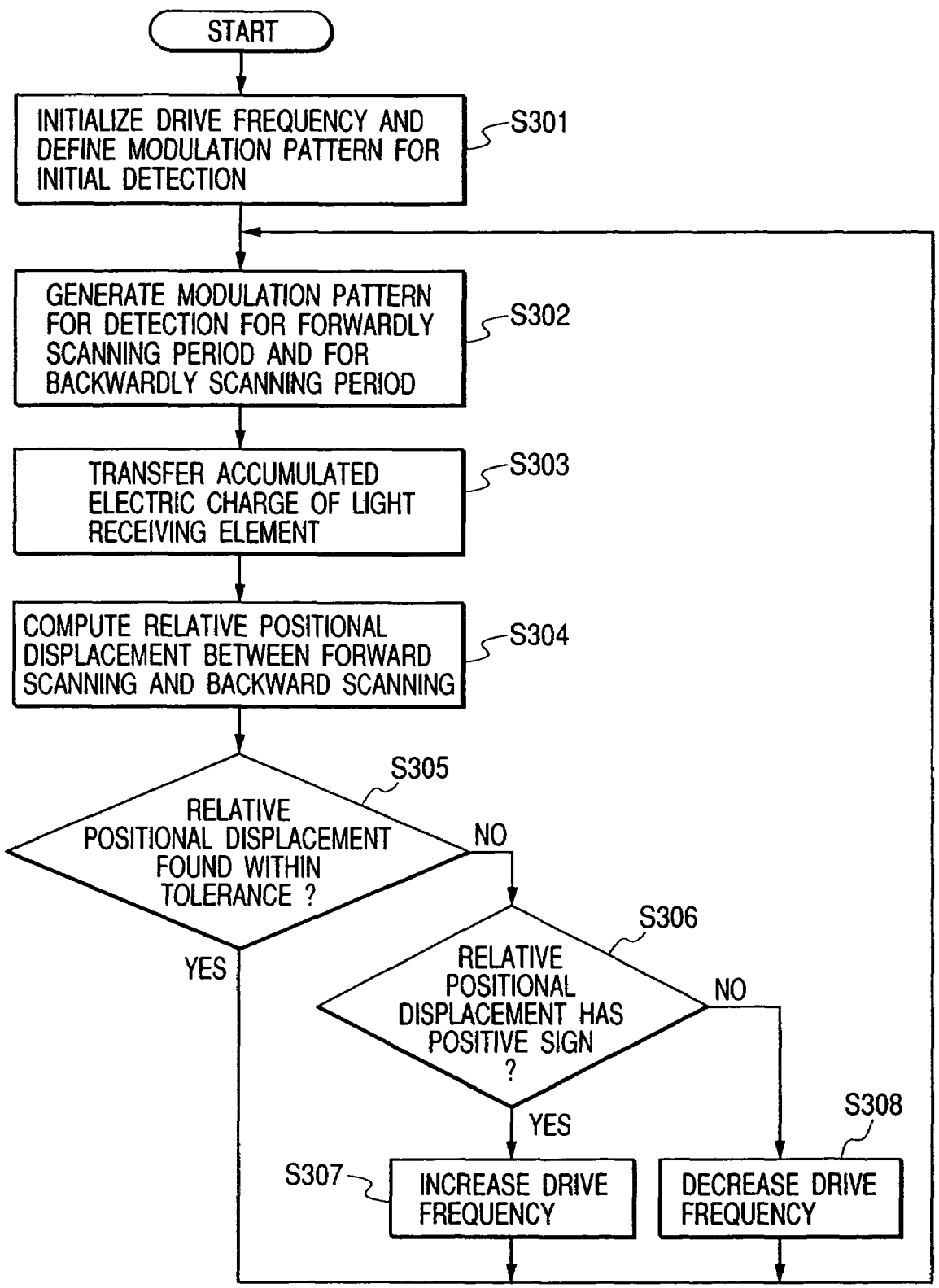
FIG. 20 is a flow chart of the operation of Example 3.

FIG. 20 is a flow chart of the operation of this example.

As the control starts, firstly an initial drive frequency and an initial modulation pattern for detection are defined (S301). Firstly, the deflection means 202 is driven on the basis of the above information to generate a modulation pattern for detection.

The modulation pattern for detection is generated in such a way that it is turned on once for a forward scanning period and once for a backward scanning period (S302). After the generation of the modulated spots, the electric charge accumulated in the light receiving element is transferred by the modulated spots in such a way that the electric charge in one of the plurality of light receiving regions is transferred at a time (S303).

Then, the positional relationship and the relative positional displacement of the modulated spots are computed on the basis of the positional information on the forwardly scanning modulated spot and the backwardly scanning modulated spot (S304) by using the method described above by referring to the second embodiment for the computation.

If the computed relative positional displacement is found within the predetermined tolerance range of ±α, the steps from S302 are repeated. If, on the other hand, it is not found within the predetermined tolerance range, their positions in the horizontal direction of the light receiving element 101 are compared with each other. Note that, the relative positional displacement is defined to be positive when the forwardly scanning modulated spot is found to the left of the backwardly scanning modulated spot, whereas the relative positional displacement is defined to be negative when the forwardly scanning modulated spot is found to the right of the backwardly scanning modulated spot (S306).

If the positional displacement is positive, it is because the modulation timing is too quick and hence the forwardly scanning modulated spot is found to the left of the backwardly scanning modulated spot. Therefore, the drive frequency is raised so as to delay the phase of the resonance-type optical deflector proceed (S307).

If, on the other hand, the relative positional displacement is negative, it is because the modulation timing is too slow and hence the forwardly scanning modulated spot is found to the right of the backwardly scanning modulated spot. Therefore, the drive frequency is raised to make modulation timing quicker (S308).

Thereafter, the processing operation returns to S302 to repeat the above steps.

In this way, the relative positional displacement of the forwardly scanning modulated spot and the backwardly scanning modulated spot can be held within a predetermined range when a resonance type optical deflector is used for the deflection means. Thus, there arises no displacement between image drawing of the forwardly scanning modulated spot and that of the backwardly scanning modulated spot on projection surface so that an image is properly displayed. In other words, it is possible to realize a projection-type image forming apparatus that produces fine images.

As two-dimensional scanning beams of light are detected by means of an area sensor (light receiving element), the modulated spots can be separated from each other and identified with ease. Additionally, the light receiving element can be downsized and hence its cost can be reduced.

The light receiving element 101 is freed from restrictions of positional arrangement because of the use of a reflector mirror 222 and a lens 209 so that the entire apparatus can be downsized. Additionally, it is possible to improve the detection accuracy.

As described above by way of example, the present invention can provide an optical deflector that does not use a detection means for detecting the time when a beam of light passes by a predetermined angle of deflection of a deflection means. Therefore, an optical deflector according to the invention can very accurately control the operation of the deflection means in such a way that it is not affected by changes of environmental temperature of the deflection means and the detection circuit.

What is claimed is:

1. A method of controlling an optical deflector adapted to deflect light from a light source so as to make deflected beams of light scan, said method comprising:
    a position detecting step of detecting a position of a deflected beam of light moving on a light receiving element in one direction and a position of another deflected beam of light moving on the light receiving element in the opposite direction;
    a sensing step of sensing a phase difference between a phase as detected in said detecting step and a predefined phase; and
    a controlling step of controlling either a drive frequency being applied to said optical deflector or a modulation timing for reciprocative drawing according to an outcome of said sensing step.

2. A method according to claim 1, wherein said position detecting step is a step of detecting a modulated pixel position in a photoelectric conversion element by weighting the center coordinates of a plurality of light receiving sections on the basis of information on the detected quantity of light from each of the plurality of light receiving sections, and adding the weighted center coordinates of the light receiving sections.

3. A method according to claim 1, wherein said position detecting step is a step of determining the light receiving section having the largest quantity of light as a modulated pixel position on the basis of information on the detected quantity of light from each of the plurality of light receiving sections.

4. A method according to claim 1, wherein said position detecting step is a step of detecting a modulated pixel position by means of a plurality of photoelectric conversion elements arranged two-dimensionally and contained in the light receiving element and is also a step of detecting the positions of the deflected beams of light displaced from each other in a direction perpendicular to the scanning direction and corresponding respectively to the scanning period in the one direction and the scanning period in the opposite direction.

* * * * *

UNITED STATES PATENT AND TRADEMARK OFFICE
CERTIFICATE OF CORRECTION

PATENT NO. : 7,126,733 B2
APPLICATION NO. : 11/359441
DATED : October 24, 2006
INVENTOR(S) : Atsushi Kandori et al.

It is certified that error appears in the above-identified patent and that said Letters Patent is hereby corrected as shown below:

COLUMN 3:
Line 1, "cross sectional" should read --cross-sectional--.
Line 15, "cross sectional" should read --cross-sectional--.

COLUMN 4:
Line 35, "cross sectional" should read --cross-sectional--.

COLUMN 12:
Line 27, "cross sectional" should read --cross-sectional--.

COLUMN 13:
Line 33, "Oust" should read --(just--.

Signed and Sealed this

Twenty-fifth Day of December, 2007

JON W. DUDAS
*Director of the United States Patent and Trademark Office*